(12) United States Patent
Zhou

(10) Patent No.: US 11,444,742 B2
(45) Date of Patent: Sep. 13, 2022

(54) INFORMATION TRANSMISSION METHOD AND DEVICE, BASE STATION, AND USER EQUIPMENT

(71) Applicant: BEIJING XIAOMI MOBILE SOFTWARE CO., LTD., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 129 days.

(21) Appl. No.: 16/969,554

(22) PCT Filed: Feb. 13, 2018

(86) PCT No.: PCT/CN2018/076645
§ 371 (c)(1),
(2) Date: Aug. 12, 2020

(87) PCT Pub. No.: WO2019/157629
PCT Pub. Date: Aug. 22, 2019

(65) Prior Publication Data
US 2021/0006382 A1    Jan. 7, 2021

(51) Int. Cl.
*H04L 5/00* (2006.01)
*H04W 16/14* (2009.01)
*H04W 72/04* (2009.01)

(52) U.S. Cl.
CPC .......... *H04L 5/0094* (2013.01); *H04L 5/0098* (2013.01); *H04W 16/14* (2013.01);
(Continued)

(58) Field of Classification Search
CPC . H04L 5/0094; H04L 5/0098; H04L 27/0006; H04L 5/001; H04L 5/0053;
(Continued)

(56) References Cited

U.S. PATENT DOCUMENTS 9,930,652 B2 *   3/2018  Rashid .................. H04W 24/02
2016/0233989 A1 *   8/2016  Belghoul ............. H04L 27/0006
(Continued)

FOREIGN PATENT DOCUMENTS

CN          102202028 A      9/2011
CN          107071816 A      8/2017
(Continued)

OTHER PUBLICATIONS

Supplementary European Search Report in the European application No. 18906171.6, dated Sep. 21, 2021.
(Continued)

*Primary Examiner* — Dady Chery
(74) *Attorney, Agent, or Firm* — Arch & Lake LLP

(57) ABSTRACT

The present disclosure provides an information transmission method and device, a base station, and user equipment. Said method comprises: determining system control information of a scalable band width part (BWP), the system control information being used to inform target user equipment of configuration information of the scalable BWP in a licensed spectrum and an unlicensed spectrum respectively; sending the system control information of the scalable BWP to the target user equipment; and according to the system control information, scheduling, on the scalable BWP and, the target user equipment to transmit information. The information transmission method provided by the present disclosure can be used to improve the configuration flexibility and effective utilization rate of the unlicensed spectrum resources.

13 Claims, 39 Drawing Sheets

(52) U.S. Cl.
CPC ..... *H04W 72/042* (2013.01); *H04W 72/0446* (2013.01); *H04W 72/0453* (2013.01)

(58) Field of Classification Search
CPC ............... H04W 16/14; H04W 72/042; H04W 72/0446; H04W 72/0453
See application file for complete search history.

(56) References Cited

U.S. PATENT DOCUMENTS

| | | |
|---|---|---|
| 2017/0195099 A1 | 7/2017 | Kahtava et al. |
| 2017/0223564 A1 | 8/2017 | Dinan |
| 2018/0139615 A1* | 5/2018 | Cui ........................ H04W 24/10 |
| 2019/0141734 A1* | 5/2019 | Lei ..................... H04W 72/0453 |
| 2019/0394798 A1* | 12/2019 | Tomeba ................. H04W 74/02 |

FOREIGN PATENT DOCUMENTS

| | | |
|---|---|---|
| WO | 2015081838 A1 | 6/2015 |
| WO | 2015185256 A1 | 12/2015 |
| WO | 2017115130 A1 | 7/2017 |

OTHER PUBLICATIONS

Office Action of the Indian application No. 202047038390, dated Nov. 30, 2021.
English translation of the Written Opinion of the International Search Authority in the international application No. PCT/CN2018/076645, dated Nov. 6, 2018.
International Search Report to PCT Application No. PCT/CN2018/076645 dated Nov. 6, 2018 with English translation, (4p).
Sony, "High Level Views on NR-U BWP", 3GPP TSG RAN WG1 Meeting 91, R1-1720475, Reno, Nevada, Nov. 18, 2017, (4p).

* cited by examiner 2311, when the info on scheduling of the resource in the unlicensed band is detected from both the resource for transmitting control info in the licensed and unlicensed bands, the information on scheduling detected from the licensed band and that detected from the unlicensed band may be compared 2312, when the info on scheduling detected from the licensed band differs from that detected from the unlicensed band, the info on scheduling of the resource in the unlicensed band may be determined according to preset indication

FIG. 15

INFORMATION TRANSMISSION METHOD AND DEVICE, BASE STATION, AND USER EQUIPMENT

CROSS REFERENCE TO RELATED APPLICATIONS

The present application is the U.S. national phase of PCT Application No. PCT/CN2018/076645 filed on Feb. 13, 2018, which is incorporated herein by reference in its entirety for all purposes.

TECHNICAL FIELD

The subject disclosure relates to the field of communication, and more particularly, to a method and device for transmitting information, a base station, and User Equipment (UE).

BACKGROUND

With development of wireless communication technology, a mobile communication network is gradually evolving toward a 5th Generation (5G) network. Similar to License Assisted Access (LAA) or Long Term Evolution (LTE) on Unlicensed band (LTE-U) in a 4G LTE system, New Radio (NR) Unlicense (NR-U) in a 5G NR network further involves effective use of a wireless resource of an unlicensed band such as of 2.4 GHz, 5 GHz, etc., i.e., means for applying 5G NR over an unlicensed band.

As various technologies such as Bluetooth, Wireless Fidelity (Wi-Fi), etc., are allowed to be used in an unlicensed band, a complex interfering environment may generally be involved. Controlled use of an unlicensed band is generally recommended in order to prevent abuse. For example, use of an unlicensed band may be controlled by a licensed band. For example, LAA in LTE may be implemented by scheduling a Component Carrier (CC) in an unlicensed band. A problem with this plot is that a CC may have to be planned and activated in an unlicensed band. When applying the plot to NR-U, granularity of resource control in terms of frequency and time may be too coarse to achieve flexible configuration and effective use of a resource in an unlicensed band.

SUMMARY

In view of this, embodiments herein provide a method and device for transmitting information, a base station, and UE, capable of improving flexible configuration and effective use of a resource in an unlicensed band.

According to a first aspect herein, a method for transmitting information is applied in a base station. The method including:

determining system control information of an extensible Band Width Part (BWP), the system control information being configured to inform target User Equipment (UE) of configuration of the extensible BWP in a licensed band and an unlicensed band;

sending the system control information of the extensible BWP to the target UE; and scheduling, according to the system control information, the target UE to perform information transmission on the extensible BWP.

Optionally, the determining the system control information of the extensible BWP may include:

in response to determining that a preset trigger condition is met, configuring, for the target UE, a resource of the extensible BWP in the licensed band and a resource of the extensible BWP in the unlicensed band; and determining the system control information of the extensible BWP according to a time-frequency range of the resource of the extensible BWP in the licensed band and the resource of the extensible BWP in the unlicensed band.

Optionally, the preset trigger condition may include at least one of:

traffic to be transmitted for the target UE exceeding a preset traffic threshold;

a type of a service to be transmitted for the target UE including a preset service type; or a power consumption of the target UE being no greater than a preset power consumption threshold.

Optionally, configuring, for the target UE, the resource of the extensible BWP in the unlicensed band may include:

configuring, for the target UE, the resource of the extensible BWP in the unlicensed band on a preset channel in the unlicensed band; or configuring, for the target UE, the resource of the extensible BWP in the unlicensed band according to a historical record of scheduling the target UE in the unlicensed band.

Optionally, configuring, for the target UE, the resource of the extensible BWP in the unlicensed band may include:

monitoring an effective transmission resource meeting a preset channel quality condition in the unlicensed band; and configuring, for the target UE, the resource of the extensible BWP in the unlicensed band according to the effective transmission resource.

Optionally, the monitoring the effective transmission resource meeting the preset channel quality condition in the unlicensed band may include:

determining a target frequency range supported by the target UE in the unlicensed band; and monitoring the effective transmission resource meeting the preset channel quality condition in the target frequency range.

Optionally, the monitoring the effective transmission resource meeting the preset channel quality condition in the target frequency range may include:

monitoring, according to a preset channel bandwidth, a channel quality value of a preset channel in the target frequency range; and in response to determining that the channel quality value is no less than a preset channel quality threshold, determining the preset channel as an effective channel.

Optionally, the monitoring the effective transmission resource meeting the preset channel quality condition in the unlicensed band may include:

monitoring a full-band effective transmission resource meeting the preset channel quality condition in the unlicensed band;

determining a target frequency range supported by the target UE in the unlicensed band; and determining the effective transmission resource according to an overlapping frequency range where the full-band effective transmission resource and the target frequency range overlap.

Optionally, the configuring, for the target UE, the resource of the extensible BWP in the unlicensed band according to the effective transmission resource may include:

determining a time-domain resource range allocated to the target UE on the effective channel; and determining a time-frequency range of the resource of the extensible BWP in the unlicensed band according to the time-domain resource range and the preset channel bandwidth of the effective channel.

Optionally, the system control information of the extensible BWP may include: a time-frequency range of a resource in the licensed band, a time-frequency range of a resource in the unlicensed band, and configuration of a resource for transmitting control information among the resource in the licensed band and the resource in the unlicensed band.

Optionally, the sending the system control information of the extensible BWP to the target UE may include: sending, to the target UE, preset Downlink Control Information (DCI) for a resource in the unlicensed band by at least one of:

sending the preset DCI to the target UE by loading the preset DCI onto a resource for transmitting control information in the licensed band; or sending the preset DCI to the target UE by loading the preset DCI onto a resource for transmitting control information in the unlicensed band.

The preset DCI may include information on scheduling of the resource in the unlicensed band.

Optionally, the scheduling, according to the system control information, the target UE to perform information transmission on the extensible BWP may include:

sending, to the target UE, activation indication indicating that the extensible BWP is activated;

in response to determining that the target UE has completed transmission configuration according to the activation indication and the system control information, scheduling the target UE to perform information transmission on the extensible BWP.

Optionally, the method may further include: before the sending, to the target UE, the activation indication indicating that the extensible BWP is activated, in response to determining that the target UE is being scheduled on a first BWP in the licensed band, sending, to the target UE, deactivation indication for deactivating the first BWP.

Optionally, the determining the system control information of the extensible BWP may include:

determining, according to preset reference indication sent by the target UE, whether the target UE is supporting transmission over the unlicensed band;

in response to determining that the target UE is supporting transmission over the unlicensed band, determining the system control information of the extensible BWP.

Optionally, the determining the system control information of the extensible BWP for the target UE may include:

determining, according to at least one of a service bearing condition or a power consumption of the base station, whether the base station is supporting unlicensed band resource configuration;

in response to determining that the base station is supporting unlicensed band resource configuration, determining the system control information of the extensible BWP for the target UE.

According to a second aspect herein, a method for transmitting information may be applied in User Equipment (UE). The method includes:

acquiring system control information of an extensible Band Width Part (BWP), the extensible BWP including a resource in a licensed band and a resource in an unlicensed band;

in response to receiving activation indication indicating that the extensible BWP is activated, configuring, according to the system control information, transmission over the extensible BWP; and performing information transmission with a base station using the extensible BWP.

Optionally, the system control information of the extensible BWP may include a set location of information on scheduling of the resource in the licensed band and the resource in the unlicensed band.

The performing information transmission with the base station using the extensible BWP may include:

acquiring, according to the set location, the information on scheduling of the resource in the licensed band and the resource in the unlicensed band in the extensible BWP; and in response to determining that the base station schedules the extensible BWP, performing information transmission according to the information on scheduling.

Optionally, the information on scheduling of the resource in the unlicensed band may be acquired from the extensible BWP by at least one of:

acquiring, from a resource for transmitting control information in the licensed band, the information on scheduling of the resource in the unlicensed band; or acquiring, from a resource for transmitting control information in the unlicensed band, the information on scheduling of the resource in the unlicensed band.

Optionally, the acquiring the information on scheduling of the resource in the unlicensed band from the extensible BWP may include:

in response to determining that the information on scheduling of the resource in the unlicensed band is detected from both the resource for transmitting control information in the licensed band and the resource for transmitting control information in the unlicensed band, comparing the information on scheduling detected from the licensed band and the information on scheduling detected from the unlicensed band;

in response to determining that the information on scheduling detected from the licensed band differs from the information on scheduling detected from the unlicensed band, determining, according to preset indication, the information on scheduling of the resource in the unlicensed band.

Optionally, the preset indication may include one of:

taking the information on scheduling acquired from the resource for transmitting control information in the licensed band as the information on scheduling of the resource in the unlicensed band;

taking the information on scheduling acquired from the resource for transmitting control information in the unlicensed band as the information on scheduling of the resource in the unlicensed band; or determining, according to a combination of the information on scheduling acquired from the licensed band and the information on scheduling acquired from the unlicensed band, the information on scheduling of the resource in the unlicensed band.

Optionally, the method may further include: before the acquiring the system control information of the extensible BWP, sending preset reference indication to the base station, the preset reference indication being used for determining whether the UE is supporting transmission over the unlicensed band.

Optionally, the method may include:

in response to receiving preset control information sent by the base station, stopping sending the preset reference indication to the base station.

According to a third aspect herein, a device for transmitting information may be provided in a base station. The device may include a control information determining module, a sending module, and a transmitting module.

The control information determining module is adapted to determining system control information of an extensible Band Width Part (BWP). The system control information is configured to inform target User Equipment (UE) of configuration of the extensible BWP in a licensed band and an unlicensed band.

The sending module is adapted to sending the system control information of the extensible BWP to the target UE.

The transmitting module is adapted to scheduling, according to the system control information, the target UE to perform information transmission on the extensible BWP.

Optionally, the control information determining module may include a resource configuring sub-module and an information determining sub-module.

The resource configuring sub-module may be adapted to, in response to determining that a preset trigger condition is met, configuring, for the target UE, a resource of the extensible BWP in the licensed band and a resource of the extensible BWP in the unlicensed band.

The information determining sub-module may be adapted to determining the system control information of the extensible BWP according to a time-frequency range of the resource of the extensible BWP in the licensed band and the resource of the extensible BWP in the unlicensed band.

Optionally, the preset trigger condition may include at least one of:

traffic to be transmitted for the target UE exceeding a preset traffic threshold;

a type of a service to be transmitted for the target UE including a preset service type; or a power consumption of the target UE being no greater than a preset power consumption threshold.

Optionally, the resource configuring sub-module may include a first resource configuring unit or a second resource configuring unit.

The first resource configuring unit may be adapted to configuring, for the target UE, the resource of the extensible BWP in the unlicensed band on a preset channel in the unlicensed band.

The second resource configuring unit may be adapted to configuring, for the target UE, the resource of the extensible BWP in the unlicensed band according to a historical record of scheduling the target UE in the unlicensed band.

Optionally, the resource configuring sub-module may include a monitoring unit and a resource configuring unit.

The monitoring unit may be adapted to monitoring an effective transmission resource meeting a preset channel quality condition in the unlicensed band.

The resource configuring unit may be adapted to configuring, for the target UE, the resource of the extensible BWP in the unlicensed band according to the effective transmission resource.

Optionally, the monitoring unit may include a supported frequency determining subunit and a first monitoring subunit.

The supported frequency determining subunit may be adapted to determining a target frequency range supported by the target UE in the unlicensed band.

The first monitoring subunit may be adapted to monitoring the effective transmission resource meeting the preset channel quality condition in the target frequency range.

Optionally, the first monitoring subunit may include a channel quality monitoring subunit and an effective channel determining subunit.

The channel quality monitoring subunit is adapted to monitoring, according to a preset channel bandwidth, a channel quality value of a preset channel in the target frequency range.

The effective channel determining subunit is adapted to, in response to determining that the channel quality value is no less than a preset channel quality threshold, determining the preset channel as an effective channel.

Optionally, the monitoring unit may include a second monitoring subunit, a supported frequency determining subunit, and an effective resource determining subunit.

The second monitoring subunit may be adapted to monitoring a full-band effective transmission resource meeting the preset channel quality condition in the unlicensed band.

The supported frequency determining subunit may be adapted to determining a target frequency range supported by the target UE in the unlicensed band.

The effective resource determining subunit may be adapted to determining the effective transmission resource according to an overlapping frequency range where the full-band effective transmission resource and the target frequency range overlap.

Optionally, the resource configuring unit may include a time-domain determining subunit and a resource configuring subunit.

The time-domain determining subunit may be adapted to determining a time-domain resource range allocated to the target UE on the effective channel.

The resource configuring subunit may be adapted to determining a time-frequency range of the resource of the extensible BWP in the unlicensed band according to the time-domain resource range and the preset channel bandwidth of the effective channel.

Optionally, the system control information of the extensible BWP may include: a time-frequency range of a resource in the licensed band, a time-frequency range of a resource in the unlicensed band, and configuration of a resource for transmitting control information among the resource in the licensed band and the resource in the unlicensed band.

33. The device of claim 23, wherein the sending module may include at least one of a first sending sub-module or a second sending sub-module.

The first sending sub-module may be adapted to sending the preset DCI to the target UE by loading the preset DCI onto a resource for transmitting control information in the licensed band.

The second sending sub-module may be adapted to sending the preset DCI to the target UE by loading the preset DCI onto a resource for transmitting control information in the unlicensed band.

The preset DCI may include information on scheduling of the resource in the unlicensed band.

Optionally, the transmitting module may include an activation information sending sub-module and a transmitting sub-module.

The activation information sending sub-module may be adapted to sending, to the target UE, activation indication indicating that the extensible BWP is activated.

The transmitting sub-module may be adapted to, in response to determining that the target UE has completed transmission configuration according to the activation indication and the system control information, scheduling the target UE to perform information transmission on the extensible BWP.

Optionally, the transmitting module may further include a deactivating sub-module.

The deactivating sub-module may be adapted to, in response to determining that the target UE is being scheduled on a first BWP in the licensed band, sending, to the target UE, deactivation indication for deactivating the first BWP.

Optionally, the control information determining module may include a transmission function determining sub-module and a first control information determining sub-module.

The transmission function determining sub-module may be adapted to determining, according to preset reference indication sent by the target UE, whether the target UE is supporting transmission over the unlicensed band.

The first control information determining sub-module may be adapted to, in response to determining that the target UE is supporting transmission over the unlicensed band, determining the system control information of the extensible BWP.

Optionally, the control information determining module may include a configuration function determining sub-module and a second control information determining sub-module.

The configuration function determining sub-module may be adapted to determining, according to at least one of a service bearing condition or a power consumption of the base station, whether the base station is supporting unlicensed band resource configuration.

The second control information determining sub-module may be adapted to, in response to determining that the base station is supporting unlicensed band resource configuration, determining the system control information of the extensible BWP.

According to a fourth aspect herein, a device for transmitting information may be provided in User Equipment (UE). The device may include a control information acquiring module, a transmission configuring module, and a transmitting module.

The control information acquiring module is adapted to acquiring system control information of an extensible Band Width Part (BWP), the extensible BWP including a resource in a licensed band and a resource in an unlicensed band.

The transmission configuring module is adapted to, in response to receiving activation indication indicating that the extensible BWP is activated, configuring, according to the system control information, transmission over the extensible BWP.

The transmitting module is adapted to performing information transmission with a base station using the extensible BWP.

Optionally, the system control information of the extensible BWP may include a set location of information on scheduling of the resource in the licensed band and the resource in the unlicensed band.

The transmitting module may include a scheduling information acquiring sub-module and a transmitting sub-module.

The scheduling information acquiring sub-module may be adapted to acquiring, according to the set location, the information on scheduling of the resource in the licensed band and the resource in the unlicensed band in the extensible BWP.

The transmitting sub-module may be adapted to, in response to determining that the base station schedules the extensible BWP, performing information transmission according to the information on scheduling.

Optionally, the scheduling information acquiring sub-module may include at least one of a first acquiring unit or a second acquiring unit.

The first acquiring unit may be adapted to acquiring, from a resource for transmitting control information in the licensed band, the information on scheduling of the resource in the unlicensed band.

The second acquiring unit may be adapted to acquiring, from a resource for transmitting control information in the unlicensed band, the information on scheduling of the resource in the unlicensed band.

Optionally, the scheduling information acquiring sub-module may further include an information comparing unit and a scheduling information determining unit.

The information comparing unit may be adapted to, in response to determining that the information on scheduling of the resource in the unlicensed band is detected from both the resource for transmitting control information in the licensed band and the resource for transmitting control information in the unlicensed band, comparing the information on scheduling detected from the licensed band and the information on scheduling detected from the unlicensed band.

The scheduling information determining unit may be adapted to, in response to determining that the information on scheduling detected from the licensed band differs from the information on scheduling detected from the unlicensed band, determining, according to preset indication, the information on scheduling of the resource in the unlicensed band.

Optionally, the preset indication may include any one of:

taking the information on scheduling acquired from the resource for transmitting control information in the licensed band as the information on scheduling of the resource in the unlicensed band;

taking the information on scheduling acquired from the resource for transmitting control information in the unlicensed band as the information on scheduling of the resource in the unlicensed band; or determining, according to a combination of the information on scheduling acquired from the licensed band and the information on scheduling acquired from the unlicensed band, the information on scheduling of the resource in the unlicensed band.

Optionally, the device may further include a reference information sending module.

The reference information sending module may be adapted to sending preset reference indication to the base station. The preset reference indication may be used for determining whether the UE is supporting transmission over the unlicensed band.

Optionally, the device may include a sending canceling module.

The sending canceling module may be adapted to, in response to receiving preset control information sent by the base station, stopping sending the preset reference indication to the base station.

According to a fifth aspect herein, a non-transitory computer-readable storage medium has stored thereon computer-executable instructions which, when executed by a processor, allow the processor to implement any method of the first aspect.

According to a sixth aspect herein, a non-transitory computer-readable storage medium has stored thereon computer-executable instructions which, when executed by a processor, allow the processor to implement any method of the second aspect.

According to a seventh aspect herein, a base station may include a processor and memory.

The memory is adapted to storing an instruction executable by the processor.

The processor is adapted to implementing:

determining system control information of an extensible Band Width Part (BWP), the system control information being configured to inform target User Equipment (UE) of configuration of the extensible BWP in a licensed band and an unlicensed band;

sending the system control information of the extensible BWP to the target UE; and scheduling, according to the system control information, the target UE to perform information transmission on the extensible BWP.

According to an eighth aspect herein, User Equipment (UE) may include a processor and memory.

The memory is configured to store an instruction executable by the processor.

The processor is configured to implement:

acquiring system control information of an extensible Band Width Part (BWP), the extensible BWP including a resource in a licensed band and a resource in an unlicensed band;

in response to receiving activation indication indicating that the extensible BWP is activated, configuring, according to the system control information, transmission over the extensible BWP; and performing information transmission with a base station using the extensible BWP.

A technical solution herein includes beneficial effects as follows.

With embodiments herein, a base station may configure, for target UE, an extensible BWP including both a resource in a licensed band and a resource in an unlicensed band. The base station may send system control information of the extensible BWP to the target UE. Accordingly, the target UE may perform transmission configuration according to the system control information of the extensible BWP. Thus, when the base station subsequently schedules the target UE on the extensible BWP, the target UE may perform information transmission with the base station using both a resource of the extensible BWP in the licensed band and a resource of the extensible BWP in the unlicensed band. The base station may configure an extensible BWP for the target UE. Accordingly, a resource in the licensed band and a resource in the unlicensed band may be used together, ensuring reliability of transmission, enhancing flexibility in configuring a resource in an unlicensed band by a 5G NR system, improving efficiency in transmission of data of the 5G NR system, thereby effectively improving user experience of 5G network equipment.

The above general description and detailed description below are but exemplary and explanatory, and do not limit the subject disclosure.

BRIEF DESCRIPTION OF THE ACCOMPANYING DRAWINGS

Drawings here are incorporated in and constitute part of the subject disclosure, illustrate embodiments according to the subject disclosure, and together with the subject disclosure, serve to explain the principle of the subject disclosure.

FIG. 15 is a flowchart of a method for transmitting information according to an exemplary embodiment herein.

DETAILED DESCRIPTION

Figure 1:
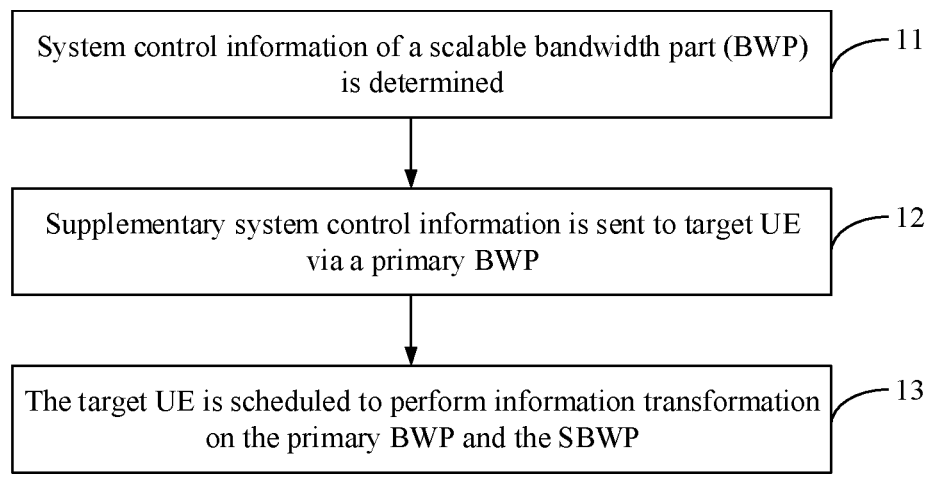
FIG. 1 is a diagram of a scene of transmitting information in related art.

Exemplary embodiments (examples of which are illustrated in the accompanying drawings) are elaborated below. The following description refers to the accompanying drawings, in which identical or similar elements in two drawings are denoted by identical reference numerals unless indicated otherwise. Implementations set forth in the following exemplary embodiments do not represent all implementations in accordance with the subject disclosure. Rather, they are mere examples of the apparatus (i.e., device) and method in accordance with certain aspects of the subject disclosure as recited in the accompanying claims.

A performing party herein may include a base station, UE, etc. A base station may be a base station, a sub-base station, etc., provided with a large-scale array of antennae. UE may be a user terminal, a user node, a mobile terminal, a tablet computer, etc. During implementation, a base station and UE may be independent of and connected to each other, together implementing a technical solution herein.

In a 5G NR network, a bandwidth of a band may be around 1 GHz. A bandwidth of a carrier may range from 80 MHz to 400 MHz. For sake of consideration such as energy saving of UE in a 5G network, a carrier may be divided into multiple Band Width Parts (BWP). A base station may schedule UE on one or more BWPs.

Based on this, embodiments herein provide a method for transmitting information. The method is applicable to a 5G NR network. With the method, UE may be scheduled in a BWP including both a resource in an unlicensed band and a resource in a licensed band. According to an embodiment herein, such a BWP including both a resource in an unlicensed band and a resource in a licensed band may be referred to as an extensible BWP.

FIG. 1 is a flowchart of a method for transmitting information according to an exemplary embodiment herein. The method is applicable to a base station in a 5G NR network. The method may include a step as follows.

In S11, system control information of an extensible bandwidth part (BWP) is determined. The system control information is configured to inform target User Equipment (UE) of configuration of the extensible BWP in a licensed band and an unlicensed band.

According to an embodiment herein, a base station may configure a resource in an extensible BWP for UE. The extensible BWP may include both a resource in a licensed band and a resource in an unlicensed band. Accordingly, target UE may transmit information using both a resource in a licensed band and a resource in an unlicensed band, improving efficiency in data transmission in a 5G NR network.

Figure 2:
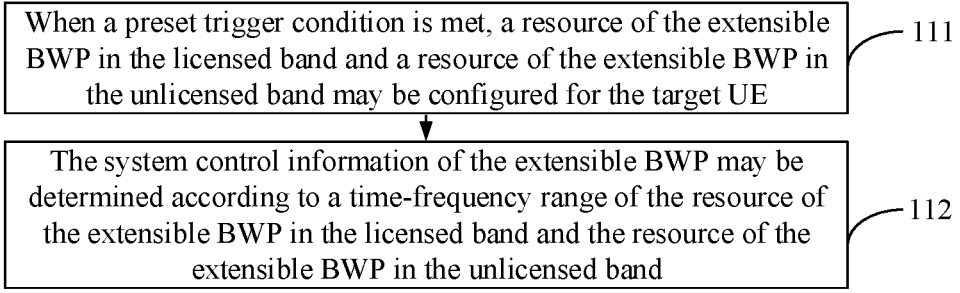
FIG. 2 is a flowchart of a method for transmitting information according to an exemplary embodiment herein.

As an example, a solution herein may be elaborated below where a base station configures an extensible BWP for target UE. FIG. 2 is a flowchart of a method for transmitting information according to an exemplary embodiment herein. S11 may include a step as follows.

In S111, when a preset trigger condition is met, a resource of the extensible BWP in the licensed band and a resource of the extensible BWP in the unlicensed band may be configured for the target UE.

According to an embodiment herein, a base station may configure the extensible BWP for target UE when triggered by at least one trigger condition as follows.

A condition 1 may be that traffic to be transmitted for the target UE exceeds a preset traffic threshold.

According to an embodiment herein, a base station may determine, according to downlink traffic and/or uplink traffic to be transmitted for target UE, current traffic $W1$ to be transmitted for the target UE. Uplink traffic to be transmitted may be determined by a base station according to an uplink Buffer Status Report (BSR) sent by target UE. Then, the traffic $W1$ to be transmitted may be compared to a preset traffic threshold $W0$. If $W1$ is no less than $W0$, it may be determined that an extensible BWP is to be configured for target UE. Otherwise if $W1$ is less than $W0$, it may be determined that no extensible BWP is to be configured for the target UE. That is, a transmission resource in a licensed band may be allocated to the target UE as usual, to ensure reliability of service transmission.

A condition 2 may be that a type of a service to be transmitted for the target UE includes a preset service type. A preset service type may be a broadband service, such as an enhanced Mobile Broad Band (eMBB) service.

According to an embodiment herein, a base station may determine a type of a service to be transmitted for target UE. The base station may determine whether a preset service type such as an eMBB service is included. If such a preset service type is included, the base station may determine to configure an extensible BWP for the target UE.

A condition 3 may be that a power consumption of the target UE is no greater than a preset power consumption threshold.

According to an embodiment herein, a base station may determine whether to configure an extensible BWP for target UE according to current power consumption of the target UE.

According to an embodiment herein, a base station may acquire information on a state of power consumption of transmission by target UE, such as heat dissipation, transmit power, current electricity consumption, remaining power, etc., of the target UE, or a comprehensive power-consumption-related physical quantity determined according to the various sorts of power consumption state information as mentioned above.

Specifically, after acquiring power consumption of target UE, such as current electricity consumption $P1$, a base station may compare the power consumption to a preset power consumption threshold $P0$. If $P1$ is no less than $P0$, given that transmitting information using a resource in an unlicensed band may require the target UE to consume more energy, to ensure a battery life of the target UE, the base station may determine not to configure any extensible BWP for the target UE, to avoid major power consumption when power remaining in the target UE is insufficient, ensuring a longer battery life of the target UE. Otherwise if $P1$ is less than $P0$, the base station may determine to configure an extensible BWP for the target UE. That is, when it is determined that there is enough power left in the target UE, the target UE may be allowed to transmit information on both a resource in a licensed band and a resource in an unlicensed band simultaneously to speed up information transmission.

According to an embodiment herein, target UE may send preset indication to a base station. The preset indication may be adapted to indicating whether current power consumption of the target UE exceeds a preset power consumption threshold. For example, a binary value 0 may be used to indicate that current power consumption of the target UE may be no greater than the preset power consumption threshold. A binary value 1 may be used to indicate that current power consumption of the target UE exceeds the preset power consumption threshold. The base station may determine, according to the preset indication, whether to configure an extensible BWP for target UE.

According to an embodiment herein, a preset trigger condition may be one that meets the multiple conditions simultaneously. Exemplarily, a base station may first compare total traffic to be transmitted to a preset traffic threshold. When the total traffic to be transmitted is greater than the preset traffic threshold, the base station may further determine a type of a service to be transmitted. When a preset service type is included, the base station may determine to configure an extensible BWP for target UE. Alternatively, when the condition 1 and the condition 2 are met, the base station may further determine current power consumption of the target UE. The base station may further determine whether to configure an extensible BWP for the target UE according to the condition 3.

Note that a preset trigger condition may include, but is not limited to, the three conditions. Illustration of the embodiments shall not be taken as limiting the subject disclosure.

Having determined that an extensible BWP may be configured for target UE, a base station may configure the extensible BWP for the target UE according to a resource in a licensed band and a resource in an unlicensed band. A resource of an extensible BWP in a licensed band may be configured according to related art.

A base station may configure, for target UE, a resource of an extensible BWP in an unlicensed band as follows.

In a mode 1, the resource of the extensible BWP in the unlicensed band configured for the target UE may be on a preset channel in the unlicensed band.

That is, it may be agreed on in a system in advance that when a resource in an unlicensed band is to be configured for UE, the UE may be scheduled on a preset channel in the unlicensed band designated by the system. Thus, when configuring a resource in the unlicensed band for target UE, a base station may determine one or more of the designated channels as the resource(s) of an extensible BWP in the unlicensed band.

According to an embodiment herein, configuration of a resource of an extensible BWP in an unlicensed band may include information on a preset channel in the unlicensed band. Information on a preset channel may be a frequency range of the designated channel. Information on a preset channel may be a center frequency, a bandwidth, etc., of the designated channel. Information on a preset channel may be a channel identifier of the preset designated channel. Having acquired a channel identifier of a designated channel, target UE may determine a frequency range of the designated channel based on preset system configuration information. Accordingly, a base station may inform the target UE of the frequency range of the resource in the unlicensed band using but a small amount of resources for transmitting control information, saving signaling overhead for transmitting system control information of the extensible BWP.

In a mode 2, the resource of the extensible BWP in the unlicensed band may be configured for the target UE according to a historical record of scheduling the target UE in the unlicensed band.

According to an embodiment herein, a base station may acquire a historical record of scheduling target UE in an unlicensed band according to a system agreement. The base station may determine, according to the historical record of scheduling, a resource in the unlicensed band included in an extensible BWP.

If there are multiple historical records of scheduling target UE in an unlicensed band recorded in a base station, the base station may select one or some of the historical records of scheduling as a reference according to a preset rule. For example, a base station may configure a resource of an extensible BWP in an unlicensed band for target UE according to a last historical record of scheduling. Alternatively, a base station may count historical records of scheduling. The base station may first consider configuring a resource in the unlicensed band used most frequently. Alternatively, if information on channel quality (a channel quality value) is recorded in a historical record of scheduling, a base station may sort historical records of scheduling in descending order of channel quality values. The base station may determine target information on historical scheduling with highest channel quality in the historical records of scheduling as reference information for scheduling. The base station may configure a resource of an extensible BWP in the unlicensed band according to information on a resource in the unlicensed band recorded in the reference information for scheduling.

In a mode 3, a base station may configure a resource of an extensible BWP in an unlicensed band according to an effective transmission resource in the unlicensed band monitored in real time.

Multiple technologies such as Wireless Fidelity (Wi-Fi), Blue Tooth, Ultra Wide Band (UWB), etc., are allowed to be used in an unlicensed band. This may inevitably lead to an environment of complex interference in the unlicensed band. A base station or UE may have to monitor an available resource in the unlicensed band in real time. A resource of an extensible BWP in the unlicensed band may have to be configured according to capacity of target UE to support a Radio Frequency (RF) in the unlicensed band.

Figure 3:
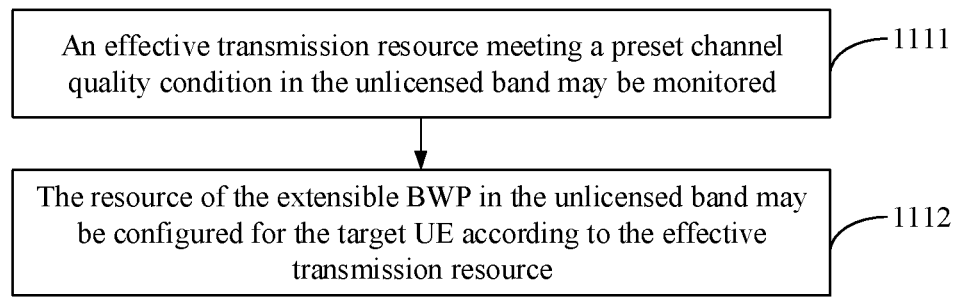
FIG. 3 is a flowchart of a method for transmitting information according to an exemplary embodiment herein.

FIG. 3 is a flowchart of a method for transmitting information according to an exemplary embodiment herein. S111 may include a step as follows.

In S1111, an effective transmission resource meeting a preset channel quality condition in the unlicensed band may be monitored.

According to an embodiment herein, an effective transmission resource in an unlicensed band may be monitored as follows.

In implementation 1, an effective transmission resource may be monitored according to capacity of target UE to support an RF in an unlicensed band.

Figure 4:
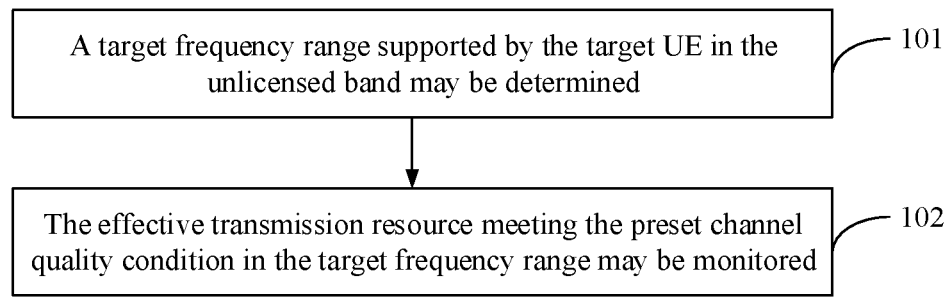
FIG. 4 is a flowchart of a method for transmitting information according to an exemplary embodiment herein.

FIG. 4 is a flowchart of a method for transmitting information according to an exemplary embodiment herein. S1111 may include a step as follows.

In S101, a target frequency range supported by the target UE in the unlicensed band may be determined.

According to an embodiment herein, a base station may determine in advance, information on capacity of target UE to support an RF, including capacity of the UE to support an RF in an unlicensed band, such as a number of bands supported, a frequency range of a band, etc. Accordingly, the base station may determine a target frequency range, expressed as f1 to f2, for example, supported by the target UE in the unlicensed band.

In S102, the effective transmission resource meeting the preset channel quality condition in the target frequency range may be monitored.

As an example, a supported target frequency in an unlicensed band may range from f1 to f2. By reciprocity of an uplink channel and a downlink channel, a base station may acquire information on channel quality of a downlink channel in a target frequency range f1 to f2 of the unlicensed band according to measurement of an uplink Sounding Reference Signal (SRS). Accordingly, the base station may determine an effective transmission resource within the target frequency range f1 to f2 meeting a preset channel quality condition.

Alternatively, a base station may send a downlink reference signal to target UE within a target frequency range f1 to f2 in an unlicensed band. The target UE may measure the downlink reference signal and return a result of the measurement to the base station. Then, the base station may determine, according to the result of measuring the downlink reference signal, an effective transmission resource within the target frequency range f1 to f2 meeting a preset channel quality condition.

A base station may monitor quality of a channel within a target frequency range in either modes as follows.

In a mode 1, a base station may monitor quality of a channel in units of preset bandwidths in frequency domain according to a preset rule of the system according to a target frequency range in an unlicensed band supported by target UE.

Figure 5:
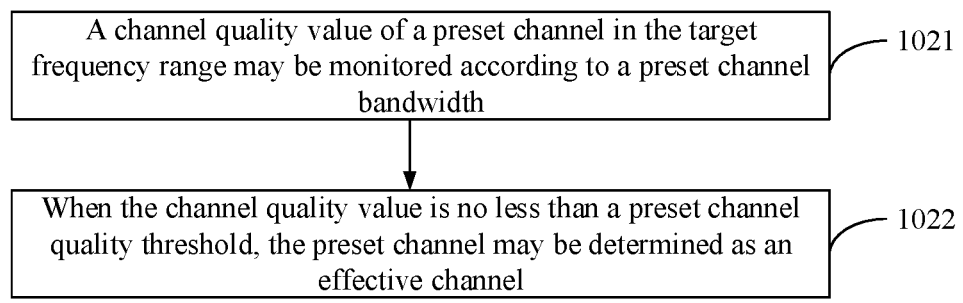
FIG. 5 is a flowchart of a method for transmitting information according to an exemplary embodiment herein.

FIG. 5 is a flowchart of a method for transmitting information according to an exemplary embodiment herein. S102 may include a step as follows.

In S1021, a channel quality value of a preset channel in the target frequency range may be monitored according to a preset channel bandwidth.

According to an embodiment herein, a target frequency range f1 to f2 in an unlicensed band supported by target UE may be of a bandwidth 20M. Then, a base station may monitor, according to a preset channel width, such as of 5M, channel quality value of a preset channel, such as a signal-to-noise ratio, a Channel Quality Indication (CQI) level, etc., that reflects a state of the channel.

According to an embodiment herein, a base station may divide, according to a preset channel dividing rule, such as in descending order of frequencies, a target frequency range f1 to f2 into four preset channels, in units of preset channel bandwidths, such as of 5M. The four preset channels may be referred to as a first channel, a second channel, a third channel and a fourth channel. The base station may further determine a channel identifier of a channel.

Having acquired a channel quality value of a preset channel, a base station may record, in a preset table, a correspondence among a preset channel, a channel identifier, a channel quality value, etc. Exemplarily, the correspondence is as shown in Table 1.

TABLE 1

| preset channel | channel identifier | channel quality value |
| --- | --- | --- |
| first channel | 1 | first CQI |
| second channel | 2 | second CQI |

TABLE 1-continued

| preset channel | channel identifier | channel quality value |
| --- | --- | --- |
| third channel | 3 | third CQI |
| fourth channel | 4 | fourth CQI |

In Table 1, a CQI level may be used to indicate a channel quality value of a preset channel.

In S1022, when the channel quality value is no less than a preset channel quality threshold, the preset channel may be determined as an effective channel.

According to an embodiment herein, a base station may acquire a channel quality value of a preset channel, such as a CQI level. Then, the base station may compare the channel quality value to a preset channel quality threshold. If a channel quality value of a preset channel is less than the preset channel quality threshold, the preset channel may be determined as an ineffective channel. That is, a signal within a frequency range corresponding to the preset channel may be subject to significant interference. It may not be suitable to schedule target UE on the preset channel. On the contrary, if a channel quality value of a preset channel is no less than the preset channel quality threshold, the preset channel may be determined as an effective channel. That is, a signal on the preset channel may be subject to insignificant interference. Target UE may be scheduled on the preset channel.

According to an embodiment herein, a bandwidth, such as of 5M, of an effective resource in an unlicensed band determined by a base station for target UE may be configured by the system in advance. When configuration of a resource in the unlicensed band is subsequently sent to the target UE, the target UE may be informed of only a channel identifier of an effective channel. The UE does not have to be informed of a frequency range of the effective channel, thus reducing signaling overhead, saving a resource for transmitting control information.

In a mode 2, a bases station may monitor quality of a channel within a target frequency range f1 to f2 in an unlicensed band by determining a time-frequency range of an effective transmission resource accurately using reduced sampling granularity.

As an example, a supported target frequency may range from f1 to f2, with a bandwidth of 20M. A finer reference signal sampling interval may be used. For example, sampling may be performed every 1M in frequency domain. Sampling may be performed every 25 ms in time domain. Accordingly, an effective transmission resource, such as frequency ranges spaced at intervals of 1M, may be determined accurately.

Second implementation, the base station may monitor an entire unlicensed band to determine whether there is an effective transmission resource available.

Figure 6:
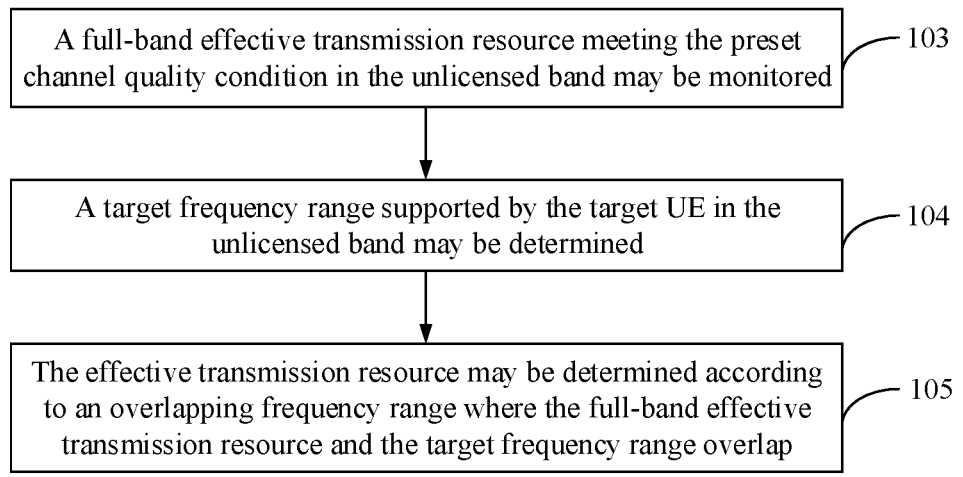
FIG. 6 is a flowchart of a method for transmitting information according to an exemplary embodiment herein.

FIG. 6 is a flowchart of a method for transmitting information according to an exemplary embodiment herein. S1111 may include a step as follows.

In S103, a full-band effective transmission resource meeting the preset channel quality condition in the unlicensed band may be monitored.

For example, an unlicensed band may be of 5 GHz. A base station may send, to all UE coverable by a signal of the base station, a downlink reference signal within an entire unlicensed band such as of 5000 MHz to 5999 MHz. Respective UE may measure the downlink reference signal and return a result of the measurement to the base station. Then, the base station may determine, according to the result of measuring the downlink reference signal, an available transmission resource within the entire unlicensed band. A result of measuring the downlink reference signal returned by the UE to the base station may be either raw data of measuring the downlink reference signal, or a channel quality value computed by the UE according to the result of measuring the downlink reference signal, such as CQI, a signal-to-noise ratio, etc.

Likewise, a base station may acquire a channel quality value of a downlink channel in an entire unlicensed band according to a result of measuring an uplink SRS, and thus determine a full-band effective transmission resource meeting a preset channel quality condition in the entire unlicensed band.

In S104, a target frequency range supported by the target UE in the unlicensed band may be determined.

Likewise, a base station may determine, according to acquired capacity of target UE to support an RF in an unlicensed band, a target frequency range, such as of f1 to f2, supported by the target UE in the unlicensed band.

In S105, the effective transmission resource may be determined according to an overlapping frequency range where the full-band effective transmission resource and the target frequency range overlap.

According to an embodiment herein, a base station may monitor an effective transmission resource in an entire unlicensed band. When a resource of an extensible BWP in the unlicensed band is to be configured for target UE, the base station may match a target frequency range and the effective transmission resource determined in the entire unlicensed band. The base station may determine, as a frequency range of an effective transmission resource, an overlapping frequency range where the full-band effective resource and the target frequency range of the target UE overlap. The base station may configure all or selected part of frequency-domain resources within the overlapping frequency range as resources of the extensible BWP in the unlicensed band. In such a mode, a monitoring delay may be reduced, improving efficiency in configuring a resource of an extensible BWP in an unlicensed band.

In S1112, the resource of the extensible BWP in the unlicensed band may be configured for the target UE according to the effective transmission resource.

Having determined an effective transmission resource in an unlicensed band, a base station may determine, within the effective transmission resource, a resource in the unlicensed band constituting an extensible BWP.

According to an embodiment herein, a frequency range of an extensible BWP may include a range of licensed frequencies and a range of unlicensed frequencies. A range of unlicensed frequencies may be a continuous frequency range in an unlicensed band. Alternatively, a range of unlicensed frequencies may include at least two discontinuous frequency ranges.

Figure 7A:
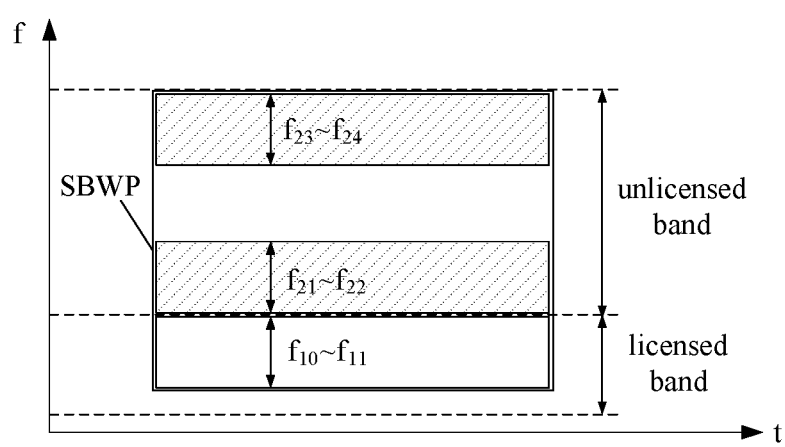
FIG. 7A is a diagram of a scene of transmitting information according to an exemplary embodiment herein.
Figure 7B:
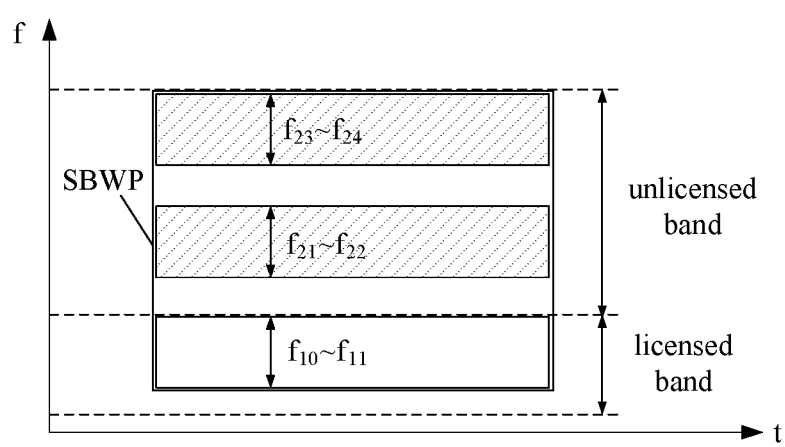
FIG. 7B is a diagram of a scene of transmitting information according to an exemplary embodiment herein.

Exemplarily, a range of licensed frequencies of an extensible BWP may be expressed as $f_{10}$ to $f_{11}$. A range of unlicensed frequencies of the extensible BWP may include a first unlicensed band $f_{21}$ to $f_{22}$ and a second unlicensed band $f_{23}$ to $f_{24}$. Then, the range of licensed frequencies may be adjacent to one of the two ranges of unlicensed frequencies. For example, $f_{11}$ may be adjacent to $f_{21}$, except that $f_{11}$ may belong to the licensed band and $f_{21}$ may belong to the unlicensed band, as shown in FIG. 7A, which is a diagram of a structure of an extensible BWP according to an exemplary embodiment herein. Alternatively, the range of licensed frequencies may neighbor neither range of unlicensed frequencies, as shown in FIG. 7B, which is a diagram of a structure of an extensible BWP according to an exemplary embodiment herein.

In S12, the system control information of the extensible BWP is sent to the target UE.

System control information of an extensible BWP determined by a base station for target UE may include configuration of a resource in a licensed band and configuration of a resource in an unlicensed band. Information on configuration of a resource in a licensed band may include a time-frequency range of the resource in the licensed band included in the extensible BWP, information on setting of a reference signal, information on setting of a synchronization signal, information on scheduling, etc. Likewise, configuration of a resource in an unlicensed band may include a time-frequency range of the resource in the unlicensed band included in the extensible BWP, information on setting of a reference signal, information on setting of a synchronization signal, information on scheduling, etc.

A base station may send system control information of an extensible BWP to target UE as follows. According to an embodiment herein, before activating an extensible BWP, a base station may send system control information of the extensible BWP to target UE through a conventional BWP. A conventional BWP may be a BWP scheduled in a licensed band by a base station before scheduling an extensible BWP. In such a mode, system control information of an extensible BWP may include a time-frequency range of a resource in a licensed band, a time-frequency range of a resource in an unlicensed band, and configuration of a resource for transmitting control information among the resource in the licensed band and the resource in the unlicensed band. Information on configuration of a resource for transmitting control information among resources in the bands may be configured to inform target UE of a set location of a resource for transmitting control information, such as a Control Resource Set (CORESET), among resources in a licensed band, whether a resource for transmitting control information is set among resources in an unlicensed band, a type of DCI borne on a resource for transmitting control information, etc.

According to an embodiment herein, system control information of an extensible BWP may be sent to target UE through a resource for transmitting control information of the extensible BWP.

A base station may send preset DCI for a resource in an unlicensed band to target UE through a resource for transmitting control information of an extensible BWP. Preset DCI for an unlicensed band may include at least information on scheduling of a resource in the unlicensed band. The preset DCI may further include information on setting of a synchronization signal, information on setting of a reference signal for the resource in the unlicensed band, etc.

Depending on whether a base station has configured a resource for transmitting control information among resources of an extensible BWP in an unlicensed band, the base station may send, to target UE, preset DCI for a resource in the unlicensed band as follows.

In mode 1, preset DCI for a resource in an unlicensed band may be sent to target UE through a resource for transmitting control information of an extensible BWP in a licensed band.

Figure 8A:
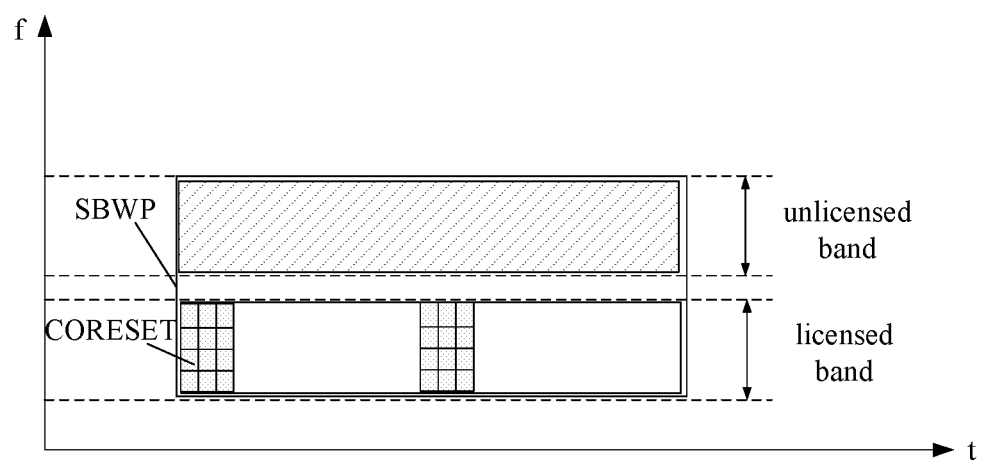
FIG. 8A is a diagram of a scene of transmitting information according to an exemplary embodiment herein.

FIG. 8A is a diagram of a structure of an extensible BWP according to an exemplary embodiment herein. According to an embodiment herein, no resource for transmitting control information is set among resources in an unlicensed band included in an extensible BWP. A resource for transmitting control information, such as a CORESET, may be set among resources of the extensible BWP in a licensed band. The CORESET may bear preset DCI for an unlicensed band, such as information on scheduling, information on setting of a synchronization signal, information on setting of a reference signal for the resource in the unlicensed band.

In such a mode, a base station may have to inform, in system control information sent to target UE in advance, the target UE of: a set location of a resource for transmitting control information among resources of an extensible BWP in a licensed band, a type of preset DCI borne on the resource for transmitting control information, etc.

In mode 2, a resource for transmitting control information may be set among resources of an extensible BWP in an unlicensed band. Then, preset DCI for a resource in the unlicensed band may be sent to target UE through the resource for transmitting control information in the unlicensed band.

Figure 8B:
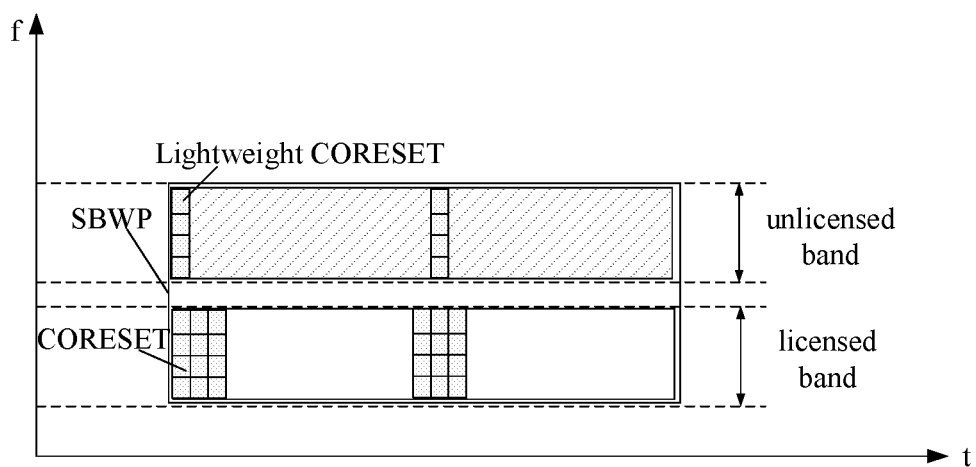
FIG. 8B is a diagram of a scene of transmitting information according to an exemplary embodiment herein.

FIG. 8B is a diagram of a structure of an extensible BWP according to an exemplary embodiment herein. According to an embodiment herein, a small amount of resources for transmitting control information, such as a small CORESET (referred to as a lightweight CORESET herein), may be set among resources in an unlicensed band included in an extensible BWP. A lightweight CORESET may bear preset DCI for the unlicensed band, such as information on setting of a synchronization signal and information on setting of a reference signal for a resource in the unlicensed band, all or part of information on scheduling of the resource in the unlicensed band, etc.

In such a mode, a base station may have to inform, in system control information sent to target UE in advance, the target UE of: a set location of a resource for transmitting control information in an unlicensed band among resources of an extensible BWP in the unlicensed band, a type of preset DCI borne on the resource for transmitting control information in the unlicensed band, etc.

In a mode 3, a resource for transmitting control information may be set among resources of an extensible BWP in an unlicensed band. Then, preset DCI for a resource in the unlicensed band may be configured on both a resource for transmitting control information in a licensed band and the resource for transmitting control information in the unlicensed band. The preset DCI may be sent to target UE by redundant transmission, ensuring that the target UE may acquire the complete preset DCI for the resource in the unlicensed band.

In such a mode, in addition to informing target UE of set locations of resources for transmitting control information in the respective bands and a type of preset DCI borne thereon, a base station may further have to inform, in system control information sent to the target UE in advance, the target UE how to acquire accurate preset DCI for a resource in an unlicensed band when preset DCI for the resource in the unlicensed band acquired from the resource for transmitting control information in the licensed band differs from that acquired from the resource for transmitting control information in the unlicensed band.

According to an embodiment herein, a base station may send system control information to target UE through broadcast signaling, upper-layer signaling, physical-layer downlink control signaling, etc. Upper-layer signaling may be Radio Resource Control (RRC) signaling, Medium Access Control (MAC) Control Element (CE) signaling, etc.

In S13, the target UE is scheduled, according to the system control information, to perform information transmission on the extensible BWP.

Figure 9:
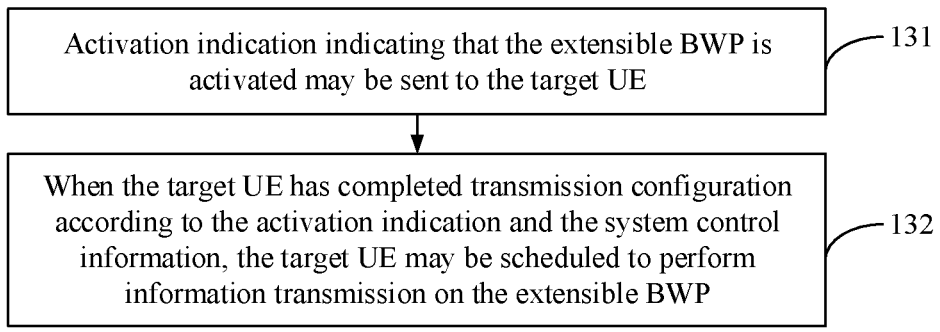
FIG. 9 is a flowchart of a method for transmitting information according to an exemplary embodiment herein.

After a base station has sent system control information of an extensible BWP to target UE, it may be taken by default that the target UE is instructed to perform transmission configuration according to the system control information. According to an embodiment herein, a base station may inform target UE explicitly that an extensible BWP is activated. FIG. 9 is a flowchart of a method for transmitting information according to an exemplary embodiment herein. S13 may include a step as follows.

In S131, activation indication indicating that the extensible BWP is activated may be sent to the target UE.

According to an embodiment herein, instead of performing transmission configuration instantly upon receiving system control information of an extensible BWP sent by a base station, target UE may postpone performing the transmission configuration according to the system control information of the extensible BWP until receiving activation indication sent by the base station, thereby avoiding loss of information transmitted based on a conventional BWP as well as unnecessary retransmission.

In S132, when the target UE has completed transmission configuration according to the activation indication and the system control information, the target UE may be scheduled to perform information transmission on the extensible BWP.

According to an embodiment herein, having determined, according to a preset rule, that target UE has completed configuration of transmission over an extensible BWP, a base station may schedule, according to system control information, the target UE to perform information transmission on the extensible BWP.

A base station may determine that target UE has completed configuration of transmission over an extensible BWP as follows. In a first mode, a base station may receive configuration completion information returned by target UE through uplink control signaling. In a second mode, a base station may determine, according to a priori information upon expiration of a preset duration after sending activation indication, that target UE has completed configuration of transmission over an extensible BWP.

Figure 10:
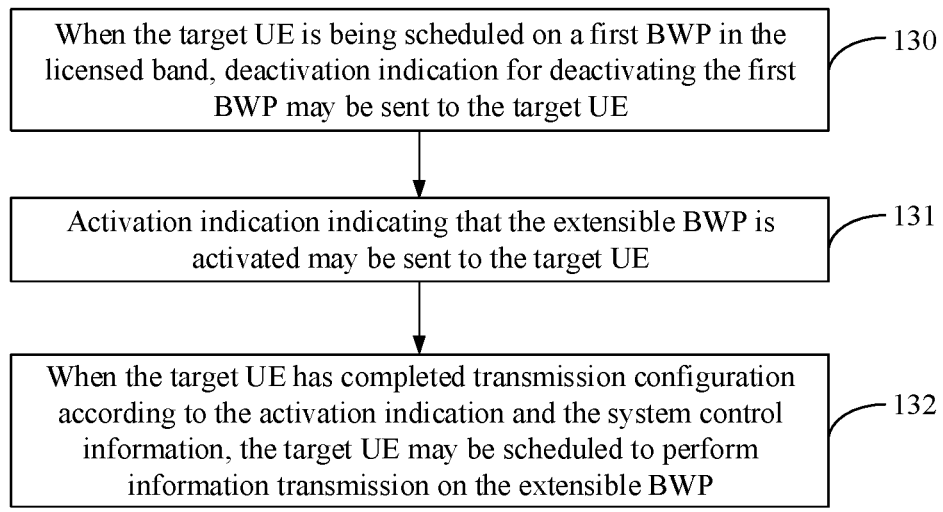
FIG. 10 is a flowchart of a method for transmitting information according to an exemplary embodiment herein.

FIG. 10 is a flowchart of a method for transmitting information according to an exemplary embodiment herein. The method may further include, before S131, a step as follows.

In S130, when the target UE is being scheduled on a first BWP in the licensed band, deactivation indication for deactivating the first BWP may be sent to the target UE.

According to an embodiment herein, a base station may be scheduling target UE to perform data transmission on a first BWP in a licensed band. Then, before activating an extensible BWP, the base station may send deactivation indication to the target UE, informing the target UE to deactivate the first BWP, namely to cancel or close configuration of transmission over the first BWP. The base station may then send activation indication to the target UE, instructing the target UE to complete configuration of transmission over the extensible BWP according to system control information to prepare for subsequent data transmission on the extensible BWP. With the deactivation/activation, switch between scheduling target UE on two transmission resources may be implemented, avoiding data loss during transmission, improving reliability of information transmission.

According to an embodiment herein, before configuring, for target UE, a resource of an extensible BWP in an unlicensed band, a base station may first determine whether the target UE is supporting transmission over the unlicensed band.

Figure 11:
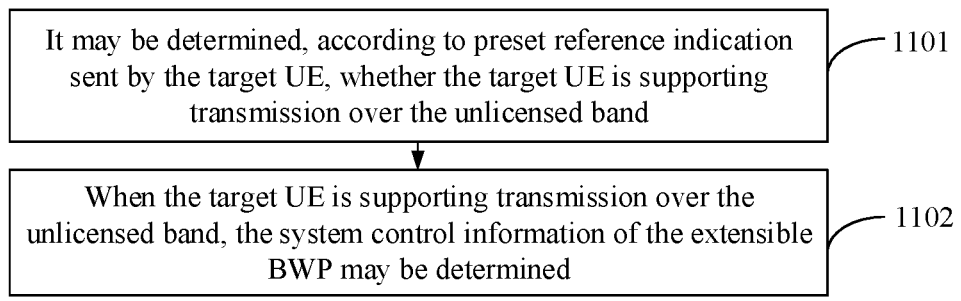
FIG. 11 is a flowchart of a method for transmitting information according to an exemplary embodiment herein.

FIG. 11 is a flowchart of a method for transmitting information according to an exemplary embodiment herein. S11 may include a step as follows.

In S1101, it may be determined, according to preset reference indication sent by the target UE, whether the target UE is supporting transmission over the unlicensed band.

According to an embodiment herein, a base station may receive preset reference indication sent by target UE. The preset reference indication may be used for determining whether the target UE is supporting an SBWP function.

According to an embodiment herein, preset reference indication may be information on a state of power consumption reported by target UE. Information on a state of power consumption may include information on current heat of the target UE such as a body temperature of the target UE, transmit power of the UE, electricity consumption or remaining power of the UE, etc., or a comprehensive power-consumption-related physical quantity determined according to the various sorts of power consumption state information as mentioned above.

A base station may determine, according to a preset rule based on information on a state of power consumption reported by target UE, whether the target UE is supporting transmission over an unlicensed band. For example, a current body temperature of target UE may be no greater than a preset temperature threshold. Then, it may be determined that the target UE is supporting transmission over an unlicensed band. Otherwise if the current body temperature of the target UE exceeds the preset temperature threshold, it may be determined that the target UE is not supporting transmission over the unlicensed band.

According to an embodiment herein, preset reference indication may be preset indication sent by target UE. The preset indication may be adapted to indicating whether transmission over an unlicensed band is supported.

The preset indication may include supporting indication indicating that target UE is supporting transmission over an unlicensed band. Alternatively, the preset indication may include reject indication indicating that the target UE is not supporting transmission over the unlicensed band.

Preset indication may be transmitted as follows. Preset indication may be represented by one bit to save signaling overhead. For example, supporting indication may be represented by a binary value 1. Reject indication may be represented by a value 0.

In S1102, when the target UE is supporting transmission over the unlicensed band, the system control information of the extensible BWP may be determined.

As shown in an aforementioned example, if a base station receives supporting indication sent by target UE, S11 may be performed. Otherwise if the base station receives reject indication sent by the target UE, no extensible BWP resource has to be configured for the target UE, nor S11 to S13 has to be performed.

With embodiments herein, it may be determined, according to indication of a state of power consumption of target UE, that the target UE is supporting transmission over an unlicensed band. Then, an extensible BWP may be configured for the target UE, avoiding configuration of a resource in an unlicensed band for target UE that is already consuming excessive power, which otherwise may further increase power consumption of the target UE and impact life of the UE. Thus, with embodiments herein, target UE may be protected from being overloaded, improving a battery life of the UE, increasing a service life of the target UE.

Figure 12:
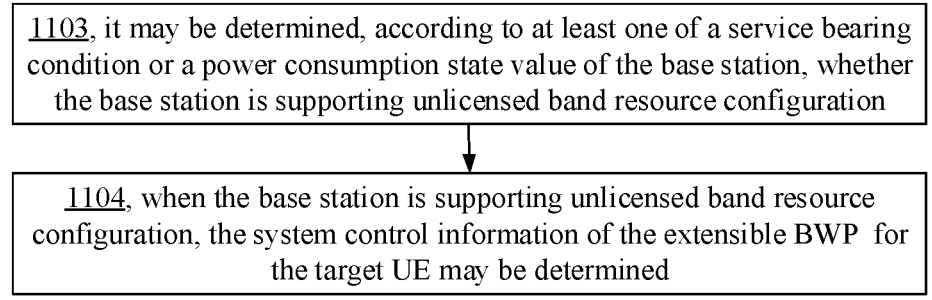
FIG. 12 is a flowchart of a method for transmitting information according to an exemplary embodiment herein.

According to an embodiment herein, based on any of the embodiments above, before determining to configure, for target UE, a resource of an extensible BWP in an unlicensed band, a base station may first determine whether it is supporting unlicensed band resource configuration. FIG. 12 is a flowchart of a method for transmitting information according to an exemplary embodiment herein. S11 may include a step as follows.

In S1103, it may be determined, according to at least one of a service bearing condition or a power consumption of the base station, whether the base station is supporting unlicensed band resource configuration.

According to an embodiment herein, a base station may determine a current service load according to a number of accessing UE within an area covered by a signal of the base station. If the current service load of the base station exceeds a preset load threshold, to ensure network transmission performance, the base station may refuse to configure an extensible BWP for target UE.

According to an embodiment herein, a base station may further determine whether extensible BWP configuration is being supported according to information on a state of power consumption of the base station, such as heat generated, transmit power, etc. Exemplarily, if current transmit power of a base station exceeds a preset power threshold, in order to avoid further increase of power consumption due to configuration of a resource in an unlicensed band, the base station may determine not to support extensible BWP configuration.

According to an embodiment herein, a base station may further determine, according to a current service bearing condition and a power consumption state, a comprehensive physical quantity representing a load of the base station. The base station may determine whether to support extensible BWP configuration by comparing the comprehensive physical quantity to a preset threshold.

In S1104, when the base station is supporting unlicensed band resource configuration, the system control information of the extensible BWP may be determined.

According to an embodiment herein, corresponding to an embodiment shown in FIG. 11, target UE may report preset reference indication to a base station periodically. The base station may determine, according to at least one of a service bearing condition or a power consumption of the base station, not to support unlicensed band resource configuration. Then, the base station may further send preset control information to the target UE, thereby instructing the UE to stop reporting the preset reference indication to the base station, saving signaling overhead and power consumption of the UE, avoiding consumption of more power by the base station due to continuously processing said information.

Figure 13:
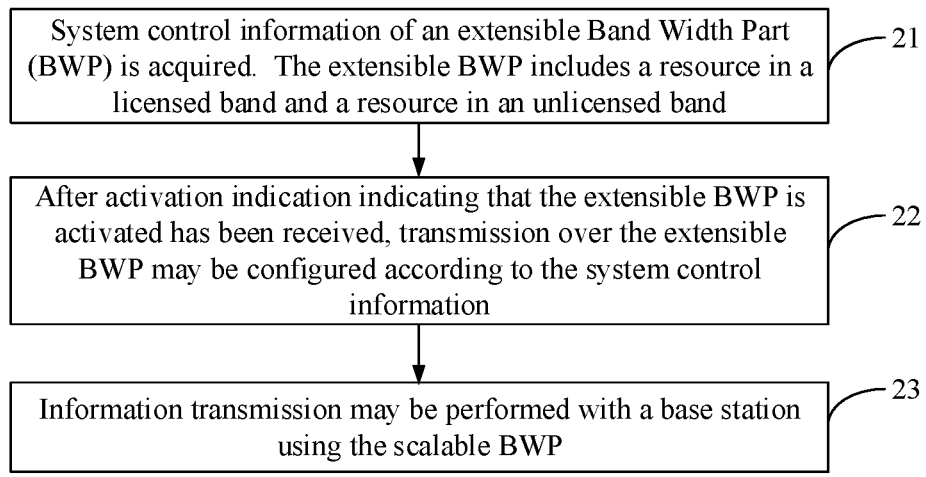
FIG. 13 is a flowchart of a method for transmitting information according to an exemplary embodiment herein.

Correspondingly, embodiments herein further provide a method for transmitting information applicable to UE. FIG. 13 is a flowchart of a method for transmitting information according to an exemplary embodiment herein. The method may include a step as follows.

In S21, system control information of an extensible Band Width Part (BWP) is acquired. The extensible BWP includes a resource in a licensed band and a resource in an unlicensed band.

Corresponding to different implementations of S12, before a base station schedules an extensible BWP, target UE may acquire system control information of the extensible BWP from a conventional BWP scheduled by the base station, for example. The system control information may include configuration of a resource of the extensible BWP in a licensed band and configuration of a resource of the extensible BWP in an unlicensed band. The configuration of a band resource may include at least a time-frequency range of the band resource. The configuration may further include configuration of a resource for transmitting control information among resources in the band, information on scheduling of the band resource, reference signal configuration information, synchronization signal configuration information, etc.

In S22, after activation indication indicating that the extensible BWP is activated is received, transmission over the extensible BWP is configured according to the system control information.

According to an embodiment herein, after receiving activation indication sent by a base station indicating that an extensible BWP is activated, UE may perform transmission configuration according to acquired system control information of the extensible BWP as follows.

In a case 1, UE may access a network for the first time. Then, the UE may directly configure transmission over an extensible BWP based on the activation indication and the acquired system control information of the extensible BWP.

In a case 2, according to an embodiment herein, UE may be scheduled on a conventional BWP in a licensed band. The conventional BWP may be referred to as a first BWP. Then, the UE may first receive deactivation indication sent by a base station to deactivate the first BWP. The UE may first cancel, according to the deactivation indication, configuration of transmission over the conventional BWP. Then, the UE may perform, according to activation indication, configuration of transmission over an extensible BWP, implementing switch from the conventional BWP to the extensible BWP, preparing the UE to transmit service data on the extensible BWP.

In S23, information transmission is performed with a base station using the extensible BWP.

Depending on whether a resource for transmitting control information of an extensible BWP bears preset control information such as information on scheduling, S23 may be implemented as follows.

In implementation 1, UE may have completed configuration of transmission over an extensible BWP before a base station schedules the extensible BWP. Then, when detecting that the base station has configured a resource of the extensible BWP, the UE may perform service data transmission data directly using a data transmission resource of the extensible BWP.

In implementation 2, a base station may send, to UE, preset control information such as information on scheduling of a band resource through a resource (of an extensible BWP) for transmitting control information.

That is, before S23, UE may have completed, according to acquired system control information, part of configuration of transmission over an extensible BWP. According to an embodiment herein, the system control information acquired by the UE in S21 may include a set location of information on scheduling of a resource in a band.

Figure 14:
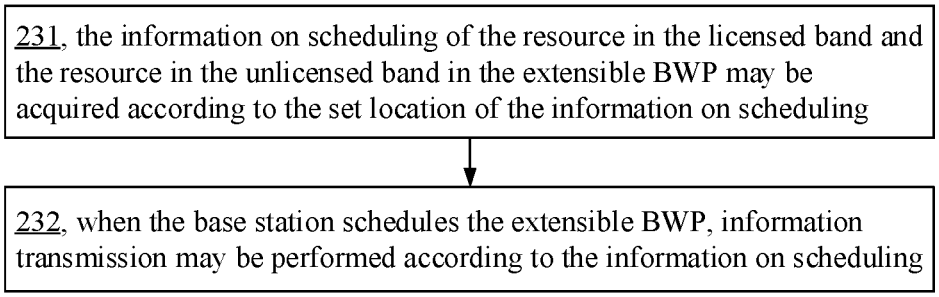
FIG. 14 is a flowchart of a method for transmitting information according to an exemplary embodiment herein.

Correspondingly, FIG. 14 is a flowchart of a method for transmitting information according to an exemplary embodiment herein. S23 may include a step as follows.

In S231, the information on scheduling of the resource in the licensed band and the resource in the unlicensed band in the extensible BWP may be acquired according to the set location.

Corresponding to configuration of a resource for transmitting control information among resources in a band configured by a base station, UE may acquire, from a resource for transmitting control information in a licensed band, such as a CORESET, information on scheduling of a resource in the licensed band. Depending on information (sent by a base station) on configuration of a resource for transmitting control information among resources in a band, UE may acquire information on scheduling of a resource in an unlicensed band as follows.

In a mode 1, no resource for transmitting control information is set among resources of an extensible BWP in an unlicensed band, as shown in FIG. 8A. Then, UE may acquire, according to configuration of a resource for transmitting control information, information on scheduling of a resource in the unlicensed band from a resource for transmitting control information in a licensed band.

In a mode 2, a resource for transmitting control information may be set among resources of an extensible BWP in an unlicensed band. The resource for transmitting control information in the unlicensed band may be a lightweight CORESET. Then, as shown in FIG. 8B, UE may acquire, according to configuration of a resource for transmitting control information, information on scheduling of a resource in the unlicensed band from the resource for transmitting control information in the unlicensed band such as the lightweight CORESET.

In a mode 3, a resource for transmitting control information may be provided among resources of an extensible BWP in an unlicensed band. Information on scheduling of a resource in the unlicensed band may be provided in both a resource in a licensed band and a resource in the unlicensed band. In this case, UE may further receive indication sent by a base station indicating how to acquire information on scheduling of a resource in the unlicensed band.

FIG. 15 is a flowchart of a method for transmitting information according to an exemplary embodiment herein. S231 may include a step as follows.

In S2311, when the information on scheduling of the resource in the unlicensed band is detected from both the resource for transmitting control information in the licensed band and the resource for transmitting control information in the unlicensed band, the information on scheduling detected from the licensed band and the information on scheduling detected from the unlicensed band may be compared.

According to an embodiment herein, UE may acquire, according to configuration of a resource for transmitting control information, information on scheduling of a resource in an unlicensed band from resources for transmitting control information of an extensible BWP in both a licensed band and the unlicensed band. Given that during transmission, information may be lost, or a transmission error may occur due to external interference, herein UE may compare information on scheduling of a resource in an unlicensed band actually acquired from a licensed band and that detected from the unlicensed band. If the information on scheduling detected from the licensed band is consistent with the information on scheduling detected from the unlicensed band, the UE may determine either information as the information on scheduling of the resource in the unlicensed band. If the information on scheduling detected from the licensed band differs from the information on scheduling detected from the unlicensed band, S2312 may be performed.

In S2312, when the information on scheduling detected from the licensed band differs from the information on scheduling detected from the unlicensed band, the information on scheduling of the resource in the unlicensed band may be determined according to preset indication.

As mentioned above, when actual information on scheduling of a resource in an unlicensed band acquired by UE from a resource for transmitting control information in a licensed band differs from actual information on scheduling of a resource in the unlicensed band acquired from a resource for transmitting control information in the unlicensed band, information on scheduling of a resource in the unlicensed band may be determined according to preset indication sent by a base station as follows.

According to indication 1, the information on scheduling acquired from the resource for transmitting control information in the licensed band may be taken as the information on scheduling of the resource in the unlicensed band.

According to the indication, the UE may determine the information on scheduling acquired from the resource in the licensed band as the final information on scheduling of the resource in the unlicensed band.

According to indication 2, the information on scheduling acquired from the resource for transmitting control information in the unlicensed band may be taken as the information on scheduling of the resource in the unlicensed band.

The UE may determine, according to the indication sent by the base station, the information on scheduling acquired from the resource in the unlicensed band as the final information on scheduling of the resource in the unlicensed band.

According to indication 3, the information on scheduling of the resource in the unlicensed band may be determined according to a combination of the information on scheduling acquired from the licensed band and the information on scheduling acquired from the unlicensed band.

According to an embodiment herein, UE may determine, according to the indication sent by a base station, a combination of actual information on scheduling acquired from a licensed band and actual information on scheduling acquired from an unlicensed band as the final information on scheduling of the resource in the unlicensed band. This may be applicable to a case where a resource for transmitting control information in an unlicensed band is insufficient to bear all information on scheduling of a resource in the unlicensed band, and a base station configures part of the information on scheduling of a resource in the unlicensed band in resources for transmitting control information of both bands, to take advantage of the few resources for transmitting control information provided among resources in the unlicensed band. This may also be applicable to a case where information on scheduling of a resource in an unlicensed band acquired from a resource for transmitting control information in a licensed band differs from that acquired from a resource for transmitting control information in the unlicensed band. The information on scheduling of the resource in the unlicensed band may be determined according to a combination of the information on scheduling acquired from the licensed band and the information on scheduling acquired from the unlicensed band, effectively improving accuracy in acquiring information on scheduling of a resource in an unlicensed band.

In S232, when the base station schedules the extensible BWP, information transmission may be performed according to the information on scheduling.

Uplink information transmission and downlink information transmission may be performed respectively on corresponding uplink and downlink information transmission resources according to information on scheduling of an extensible BWP acquired by UE, including information on scheduling of a resource in a licensed band and information on scheduling of a resource in an unlicensed band.

Figure 16:
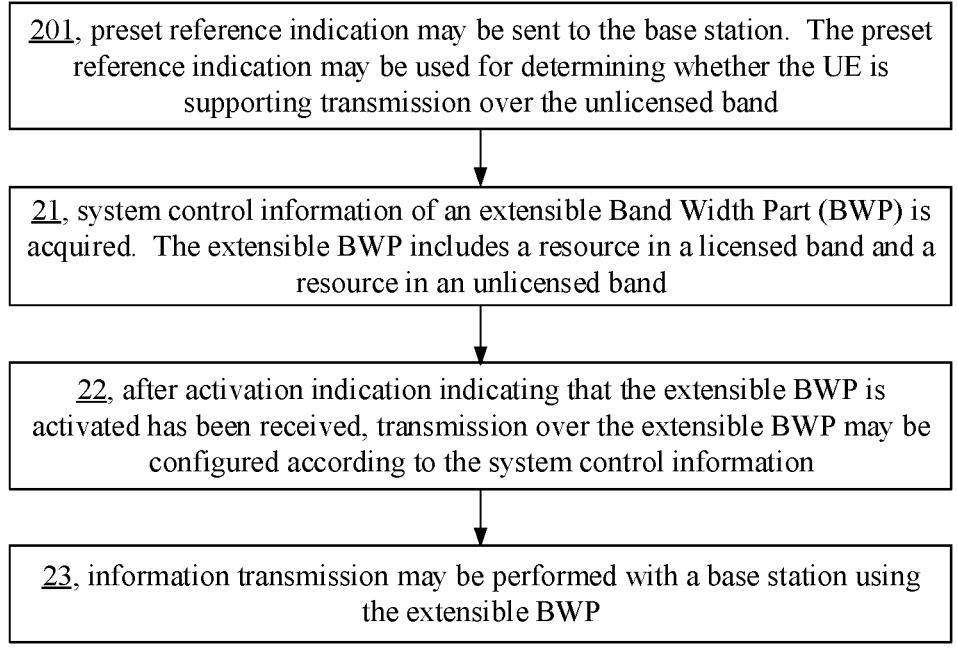
FIG. 16 is a flowchart of a method for transmitting information according to an exemplary embodiment herein.

Corresponding to an embodiment shown in FIG. 11, FIG. 16 is a flowchart of a method for transmitting information according to an exemplary embodiment herein. Based on an embodiment shown in FIG. 13, the method may further include, before S21, a step as follows.

In S201, preset reference indication may be sent to the base station. The preset reference indication may be used for determining whether the UE is supporting transmission over the unlicensed band.

Corresponding to S1101, preset reference indication may be information on a state of power consumption of UE. Alternatively, the preset reference indication may be preset indication determined by the UE according to the state of power consumption per se. The preset indication may indicate whether the UE supports transmission over an unlicensed band.

According to an embodiment herein, UE may send preset reference indication to a base station periodically or from time to time. Accordingly, the base station may be allowed to determine whether the UE is supporting transmission over an unlicensed band, such that no extensible BWP will be configured for UE not supporting transmission over the unlicensed band, avoiding wasting power and a resource.

Figure 17:
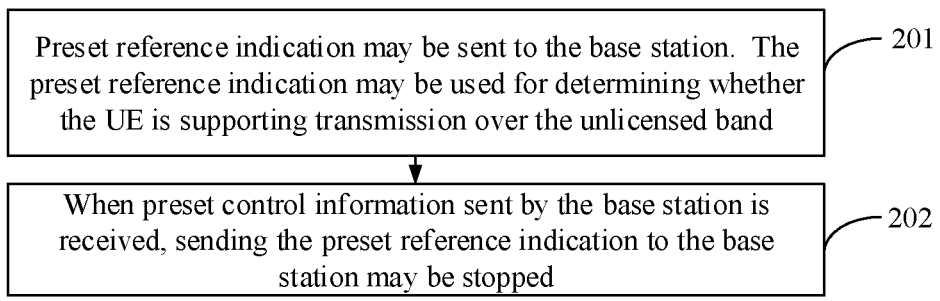
FIG. 17 is a flowchart of a method for transmitting information according to an exemplary embodiment herein.

FIG. 17 is a flowchart of a method for transmitting information according to an exemplary embodiment herein. Based on an embodiment shown in FIG. 16, the method may further include, after S201, a step as follows.

In S202, if preset control information sent by the base station is received, sending the preset reference indication to the base station may be stopped.

In an application scene according to an embodiment herein, a base station may determine, according to at least one of a service bearing condition or a power consumption state, not to support extensible BWP configuration for the moment. Then, the base station may send preset control information to UE, instructing the UE to stop sending preset reference indication. With embodiments herein, UE may stop sending preset reference indication to a base station not supporting extensible BWP configuration, avoiding power waste by the UE.

For simplicity, an embodiment herein is formulated as a combination of a series of actions. However, a person having ordinary skill in the art should know that the subject disclosure is not limited to the order of actions described. According to the subject disclosure, some steps may be performed simultaneously or in an order other than that described.

A person having ordinary skill in the art should also know that any embodiment described herein is optional. An action or module involved therein may not be required by the subject disclosure.

Corresponding to an embodiment of a method for implementing an application function, embodiments herein further provide a device for implementing an application function, as well as corresponding UE.

Figure 18:
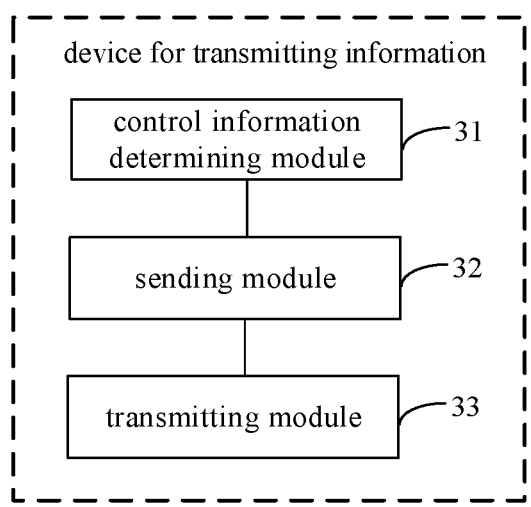
FIG. 18 is a block diagram of a device for transmitting information according to an exemplary embodiment herein.

Correspondingly, embodiments herein provide a device for transmitting information, which may be provided in a base station. FIG. 18 is a block diagram of a device for transmitting information according to an exemplary embodiment herein. The device may include a control information determining module, a sending module, and a transmitting module.

The control information determining module 31 may be adapted to determining system control information of an extensible Band Width Part (BWP). The system control information is configured to inform target User Equipment (UE) of configuration of the extensible BWP in a licensed band and an unlicensed band.

According to an embodiment herein, system control information of an extensible BWP may include a time-frequency range of a resource in a licensed band, a time-frequency range of a resource in an unlicensed band, and configuration of a resource for transmitting control information among the resource in the licensed band and the resource in the unlicensed band.

The sending module 32 may be adapted to sending the system control information of the extensible BWP to the target UE.

The transmitting module 33 may be adapted to scheduling, according to the system control information, the target UE to perform information transmission on the extensible BWP.

Figure 19:
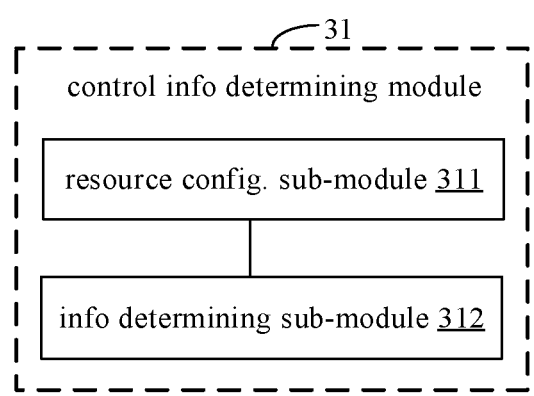
FIG. 19 is a block diagram of a device for transmitting information according to an exemplary embodiment herein.

FIG. 19 is a block diagram of a device for transmitting information according to an exemplary embodiment herein. Based on the device shown in FIG. 18, the control information determining module 31 may include a resource configuring sub-module and an information determining sub-module.

The resource configuring sub-module 311 may be adapted to, in response to determining that a preset trigger condition is met, configuring, for the target UE, a resource of the extensible BWP in the licensed band and a resource of the extensible BWP in the unlicensed band.

According to an embodiment herein, the preset trigger condition may include at least one as follows.

Traffic to be transmitted for the target UE exceeds a preset traffic threshold.

A type of a service to be transmitted for the target UE includes a preset service type.

A power consumption of the target UE is no greater than a preset power consumption threshold.

The information determining sub-module 312 may be adapted to determining the system control information of the extensible BWP according to a time-frequency range of the resource of the extensible BWP in the licensed band and the resource of the extensible BWP in the unlicensed band.

Figure 20:
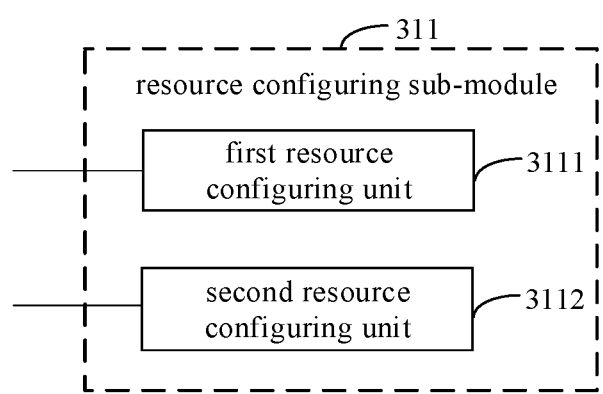
FIG. 20 is a block diagram of a device for transmitting information according to an exemplary embodiment herein.

FIG. 20 is a block diagram of a device for transmitting information according to an exemplary embodiment herein. Based on the device shown in FIG. 19, the resource configuring sub-module 311 may include a first resource configuring unit or a second resource configuring unit.

The first resource configuring unit 3111 may be adapted to configuring, for the target UE, the resource of the extensible BWP in the unlicensed band on a preset channel in the unlicensed band.

The second resource configuring unit 3112 may be adapted to configuring, for the target UE, the resource of the extensible BWP in the unlicensed band according to a historical record of scheduling the target UE in the unlicensed band.

Figure 21:
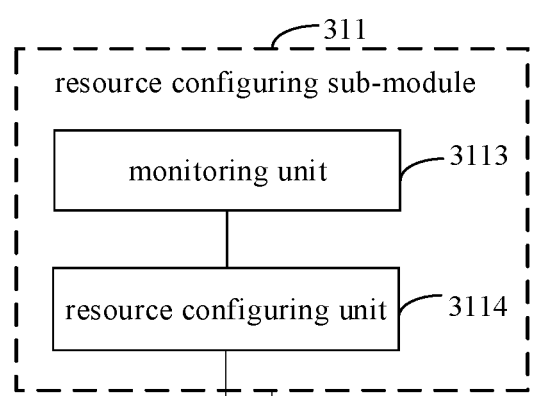
FIG. 21 is a block diagram of a device for transmitting information according to an exemplary embodiment herein.

FIG. 21 is a block diagram of a device for transmitting information according to an exemplary embodiment herein. Based on the device shown in FIG. 19, the resource configuring sub-module 311 may include a monitoring unit and a resource configuring unit.

The monitoring unit 3113 may be adapted to monitoring an effective transmission resource meeting a preset channel quality condition in the unlicensed band.

The resource configuring unit 3114 may be adapted to configuring, for the target UE, the resource of the extensible BWP in the unlicensed band according to the effective transmission resource.

Figure 22:
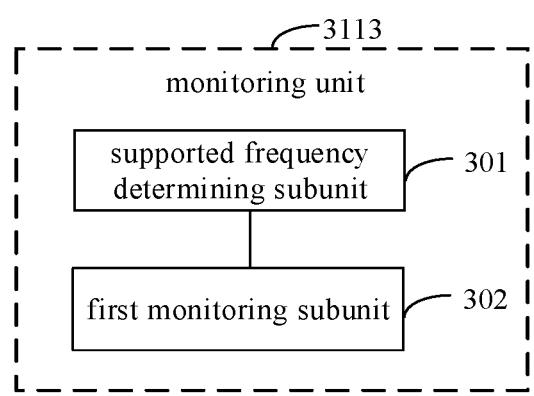
FIG. 22 is a block diagram of a device for transmitting information according to an exemplary embodiment herein.

FIG. 22 is a block diagram of a device for transmitting information according to an exemplary embodiment herein. Based on the device shown in FIG. 21, the monitoring unit 3113 may include a supported frequency determining subunit and a first monitoring subunit, The supported frequency determining subunit 301 may be adapted to determining a target frequency range supported by the target UE in the unlicensed band.

The first monitoring subunit 302 may be adapted to monitoring the effective transmission resource meeting the preset channel quality condition in the target frequency range.

Figure 23:
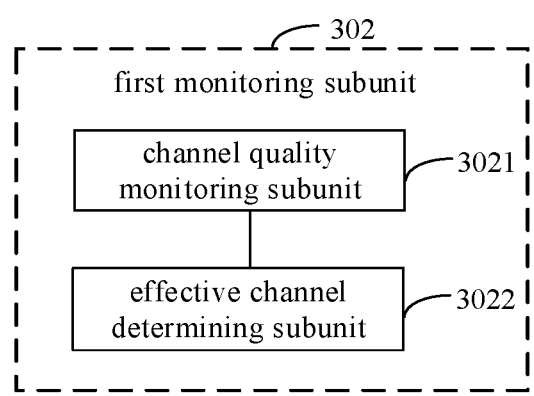
FIG. 23 is a block diagram of a device for transmitting information according to an exemplary embodiment herein.

FIG. 23 is a block diagram of a device for transmitting information according to an exemplary embodiment herein. Based on the device shown in FIG. 22, the first monitoring subunit 302 may include a channel quality monitoring subunit and an effective channel determining subunit.

The channel quality monitoring subunit 3021 may be adapted to monitoring, according to a preset channel bandwidth, a channel quality value of a preset channel in the target frequency range.

The effective channel determining subunit 3022 may be adapted to, in response to determining that the channel quality value is no less than a preset channel quality threshold, determining the preset channel as an effective channel.

Figure 24:
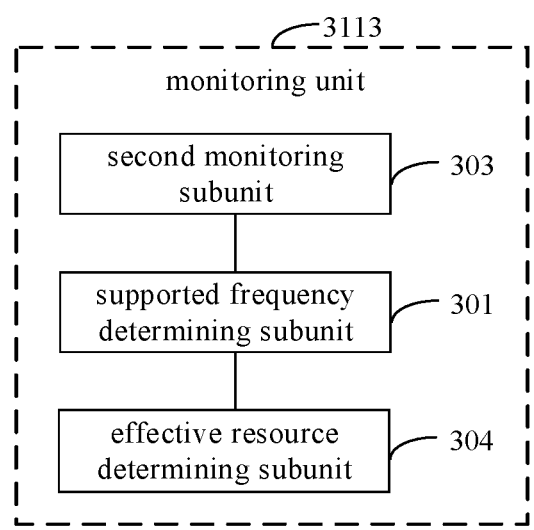
FIG. 24 is a block diagram of a device for transmitting information according to an exemplary embodiment herein.

FIG. 24 is a block diagram of a device for transmitting information according to an exemplary embodiment herein. Based on the device shown in FIG. 21, the monitoring unit 3113 may include a second monitoring subunit, a supported frequency determining subunit, and an effective resource determining subunit.

The second monitoring subunit 303 may be adapted to monitoring a full-band effective transmission resource meeting the preset channel quality condition in the unlicensed band.

The supported frequency determining subunit 301 may be adapted to determining a target frequency range supported by the target UE in the unlicensed band, The effective resource determining subunit 304 may be adapted to determining the effective transmission resource according to an overlapping frequency range where the full-band effective transmission resource and the target frequency range overlap.

Figure 25:
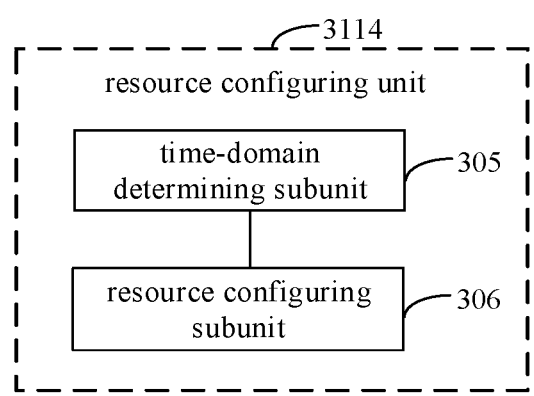
FIG. 25 is a block diagram of a device for transmitting information according to an exemplary embodiment herein.

FIG. 25 is a block diagram of a device for transmitting information according to an exemplary embodiment herein. Based on the device shown in FIG. 21, the resource configuring unit 3114 may include a time-domain determining subunit and a resource configuring subunit.

The time-domain determining subunit 305 may be adapted to determining a time-domain resource range allocated to the target UE on the effective channel.

The resource configuring subunit 306 may be adapted to determining a time-frequency range of the resource of the extensible BWP in the unlicensed band according to the time-domain resource range and the preset channel bandwidth of the effective channel.

Figure 26:
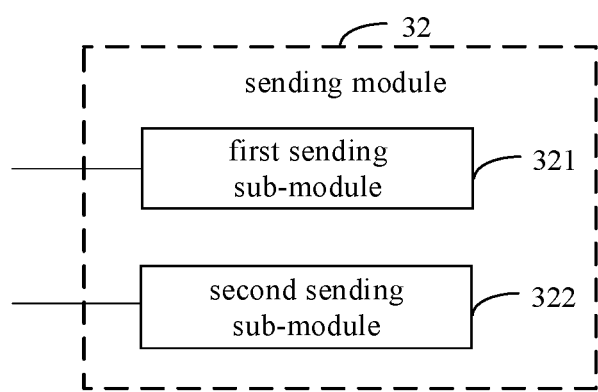
FIG. 26 is a block diagram of a device for transmitting information according to an exemplary embodiment herein.

FIG. 26 is a block diagram of a device for transmitting information according to an exemplary embodiment herein. Based on the device shown in FIG. 18, the sending module 32 may include at least one of a first sending sub-module or a second sending sub-module.

The first sending sub-module 321 may be adapted to sending the preset DCI to the target UE by loading the preset DCI onto a resource for transmitting control information in the licensed band.

The second sending sub-module 322 may be adapted to sending the preset DCI to the target UE by loading the preset DCI onto a resource for transmitting control information in the unlicensed band.

The preset DCI may include information on scheduling of the resource in the unlicensed band.

Figure 27:
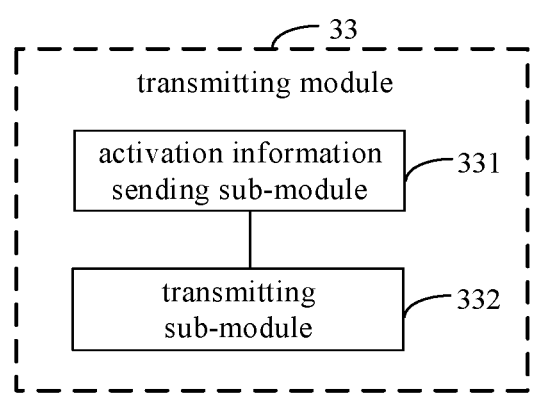
FIG. 27 is a block diagram of a device for transmitting information according to an exemplary embodiment herein.

FIG. 27 is a block diagram of a device for transmitting information according to an exemplary embodiment herein. Based on the device shown in FIG. 18, the transmitting module 33 may include an activation information sending sub-module and a transmitting sub-module.

The activation information sending sub-module 331 may be adapted to sending, to the target UE, activation indication indicating that the extensible BWP is activated.

The transmitting sub-module 332 may be adapted to, in response to determining that the target UE has completed transmission configuration according to the activation indication and the system control information, scheduling the target UE to perform information transmission on the extensible BWP.

Figure 28:
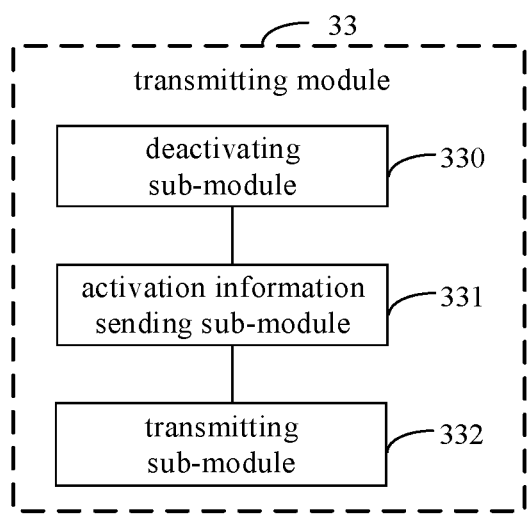
FIG. 28 is a block diagram of a device for transmitting information according to an exemplary embodiment herein.

FIG. 28 is a block diagram of a device for transmitting information according to an exemplary embodiment herein. Based on the device shown in FIG. 27, the transmitting module 33 may further include a deactivating sub-module.

The deactivating sub-module 330 may be adapted to, in response to determining that the target UE is being scheduled on a first BWP in the licensed band, sending, to the target UE, deactivation indication for deactivating the first BWP.

Figure 29:
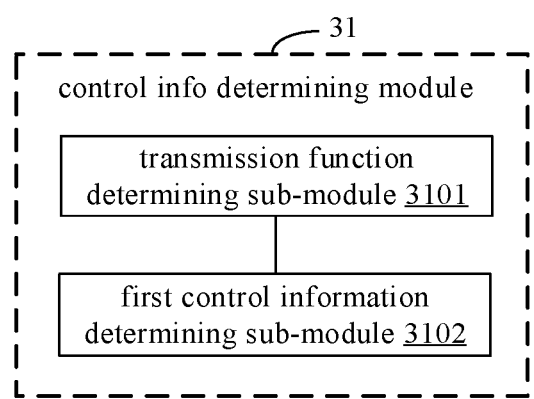
FIG. 29 is a block diagram of a device for transmitting information according to an exemplary embodiment herein.

FIG. 29 is a block diagram of a device for transmitting information according to an exemplary embodiment herein. Based on the device shown in FIG. 18, the control information determining module 31 may include a transmission function determining sub-module and a first control information determining sub-module.

The transmission function determining sub-module 3101 may be adapted to determining, according to preset reference indication sent by the target UE, whether the target UE is supporting transmission over the unlicensed band.

The first control information determining sub-module 3102 may be adapted to, in response to determining that the target UE is supporting transmission over the unlicensed band, determining the system control information of the extensible BWP.

Figure 30:
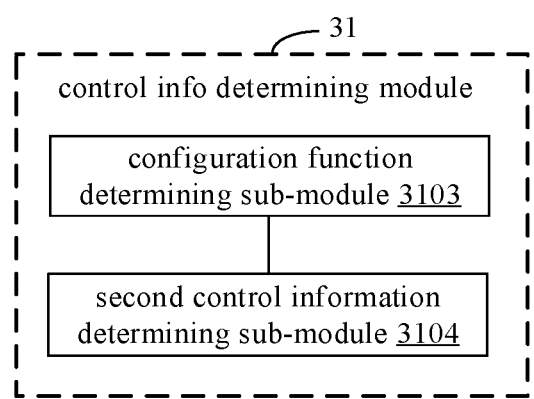
FIG. 30 is a block diagram of a device for transmitting information according to an exemplary embodiment herein.

FIG. 30 is a block diagram of a device for transmitting information according to an exemplary embodiment herein. Based on the device shown in FIG. 18, the control information determining module 31 may include a configuration function determining sub-module and a second control information determining sub-module.

The configuration function determining sub-module 3103 may be adapted to determining, according to at least one of a service bearing condition or a power consumption of the base station, whether the base station is supporting unlicensed band resource configuration.

The second control information determining sub-module 3104 may be adapted to, in response to determining that the base station is supporting unlicensed band resource configuration, determining the system control information of the extensible BWP.

Figure 31:
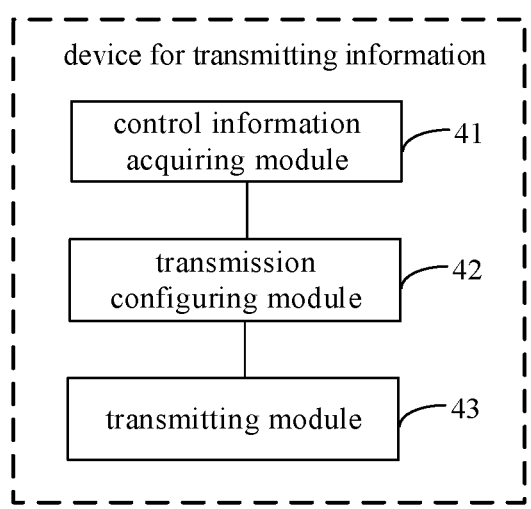
FIG. 31 is a block diagram of a device for transmitting information according to an exemplary embodiment herein.

Correspondingly, embodiments herein further provide a device for transmitting information provided in UE. FIG. 31 is a block diagram of a device for transmitting information according to an exemplary embodiment herein. The device may include a control information acquiring module, a transmission configuring module, and a transmitting module.

The control information acquiring module 41 may be adapted to acquiring system control information of an extensible Band Width Part (BWP). The extensible BWP includes a resource in a licensed band and a resource in an unlicensed band.

The transmission configuring module 42 may be adapted to, in response to receiving activation indication indicating that the extensible BWP is activated, configuring, according to the system control information, transmission over the extensible BWP.

The transmitting module 43 may be adapted to performing information transmission with a base station using the extensible BWP.

Figure 32:
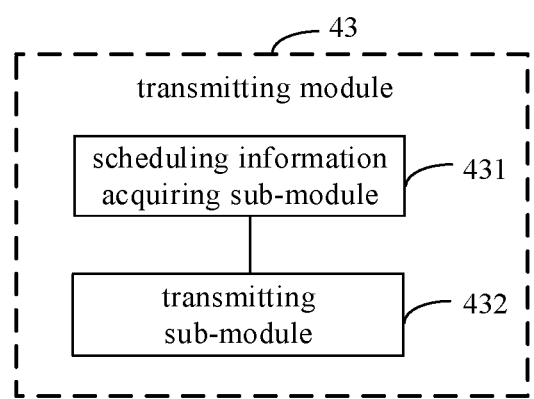
FIG. 32 is a block diagram of a device for transmitting information according to an exemplary embodiment herein.

According to an embodiment herein, the system control information of the extensible BWP may include a set location of information on scheduling of the resource in the licensed band and the resource in the unlicensed band. Correspondingly, FIG. 32 is a block diagram of a device for transmitting information according to an exemplary embodiment herein. Based on the device shown in FIG. 31, the transmitting module 43 may include a scheduling information acquiring sub-module and a transmitting sub-module.

The scheduling information acquiring sub-module 431 may be adapted to acquiring, according to the set location, the information on scheduling of the resource in the licensed band and the resource in the unlicensed band in the extensible BWP.

The transmitting sub-module 432 may be adapted to, in response to determining that the base station schedules the extensible BWP, performing information transmission according to the information on scheduling.

Figure 33:
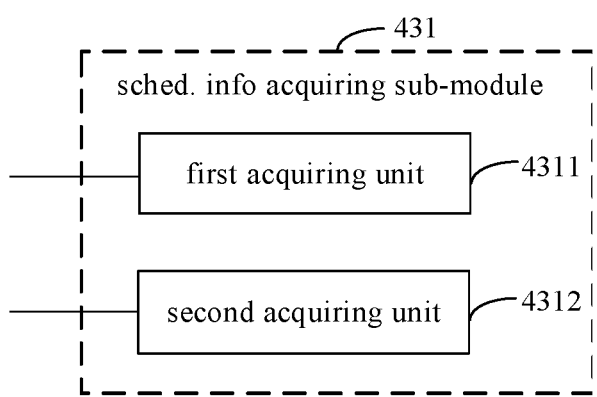
FIG. 33 is a block diagram of a device for transmitting information according to an exemplary embodiment herein.

FIG. 33 is a block diagram of a device for transmitting information according to an exemplary embodiment herein. Based on the device shown in FIG. 32, the scheduling information acquiring sub-module 431 may include at least one of a first acquiring unit or a second acquiring unit.

The first acquiring unit 4311 may be adapted to acquiring, from a resource for transmitting control information in the licensed band, the information on scheduling of the resource in the unlicensed band.

The second acquiring unit 4312 may be adapted to acquiring, from a resource for transmitting control information in the unlicensed band, the information on scheduling of the resource in the unlicensed band.

Figure 34:
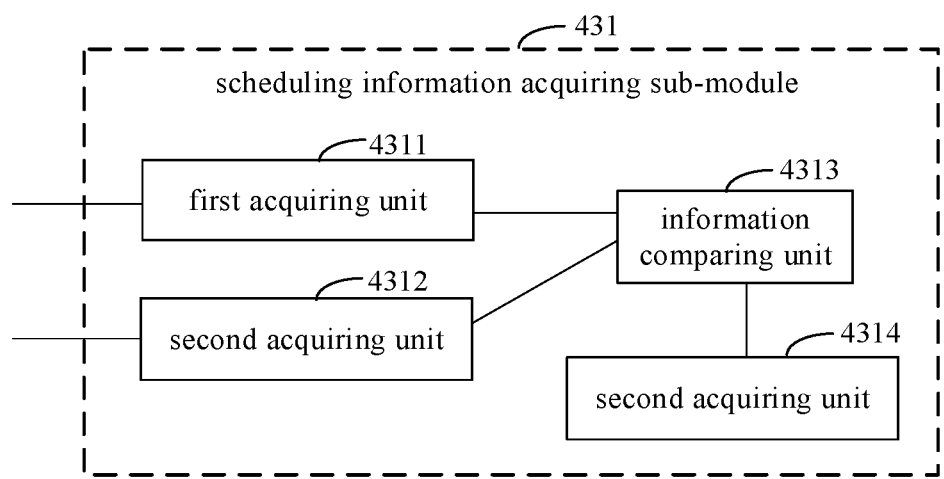
FIG. 34 is a block diagram of a device for transmitting information according to an exemplary embodiment herein.

FIG. 34 is a block diagram of a device for transmitting information according to an exemplary embodiment herein. Based on the device shown in FIG. 33, the scheduling information acquiring sub-module 431 may further include an information comparing unit and a scheduling information determining unit.

The information comparing unit 4313 may be adapted to, in response to determining that the information on scheduling of the resource in the unlicensed band is detected from both the resource for transmitting control information in the licensed band and the resource for transmitting control information in the unlicensed band, comparing the information on scheduling detected from the licensed band and the information on scheduling detected from the unlicensed band.

The scheduling information determining unit 4314 may be adapted to, in response to determining that the information on scheduling detected from the licensed band differs from the information on scheduling detected from the unlicensed band, determining, according to preset indication, the information on scheduling of the resource in the unlicensed band.

According to an embodiment herein, the preset indication may include any one as follows.

The information on scheduling acquired from the resource for transmitting control information in the licensed band is taken as the information on scheduling of the resource in the unlicensed band.

The information on scheduling acquired from the resource for transmitting control information in the unlicensed band is taken as the information on scheduling of the resource in the unlicensed band.

The information on scheduling of the resource in the unlicensed band is determined according to a combination of the information on scheduling acquired from the licensed band and the information on scheduling acquired from the unlicensed band.

Figure 35:
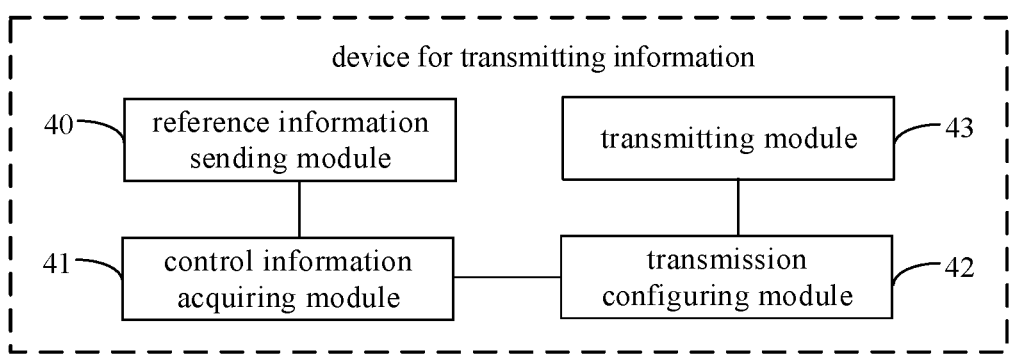
FIG. 35 is a block diagram of a device for transmitting information according to an exemplary embodiment herein.

FIG. 35 is a block diagram of a device for transmitting information according to an exemplary embodiment herein. Based on the device shown in FIG. 31, the device may further include a reference information sending module.

The reference information sending module 40 may be adapted to sending preset reference indication to the base station. The preset reference indication may be used for determining whether the UE is supporting transmission over the unlicensed band. According to an embodiment herein, based on the device shown in FIG. 35, the device may further include a sending canceling module.

The sending canceling module may be adapted to, in response to receiving preset control information sent by the base station, stopping sending the preset reference indication to the base station.

A device embodiment herein basically corresponds to a method embodiment herein, description of which may be referred to for a related part thereof. A device embodiment described herein is but schematic. Units described herein as separate parts may or may not be physically separate. A part displayed as a unit may or may not be a physical unit. That is, it may be located in one place, or distributed over multiple network units. Some or all of the modules herein may be selected as needed to achieve an effect of a solution herein. A person having ordinary skill in the art may understand and implement the above without creative effort.

Correspondingly, according to an aspect herein, a base station may include a processor and memory.

The memory is adapted to storing an instruction executable by the processor.

The processor is adapted to implementing:

determining system control information of an extensible Band Width Part (BWP), the system control information being configured to inform target User Equipment (UE) of configuration of the extensible BWP in a licensed band and an unlicensed band;

sending the system control information of the extensible BWP to the target UE; and scheduling, according to the system control information, the target UE to perform information transmission on the extensible BWP.

According to an aspect herein, UE may include a processor and memory.

The memory is adapted to storing an instruction executable by the processor.

The processor is adapted to implementing:

acquiring system control information of an extensible Band Width Part (BWP), the extensible BWP including a resource in a licensed band and a resource in an unlicensed band;

in response to receiving activation indication indicating that the extensible BWP is activated, configuring, according to the system control information, transmission over the extensible BWP; and performing information transmission with a base station using the extensible BWP.

Figure 36:
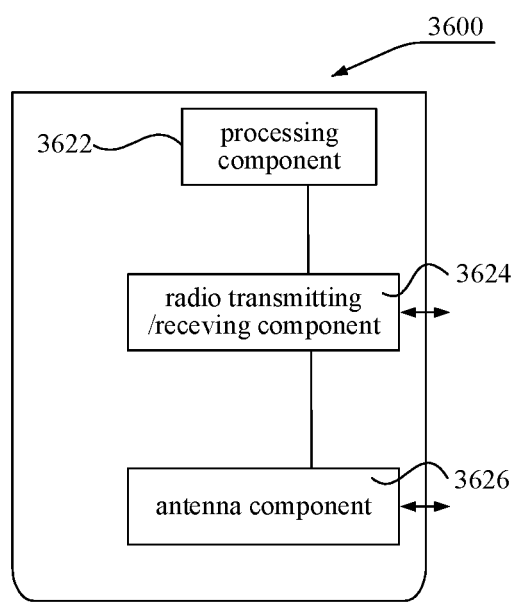
FIG. 36 is a diagram of a structure of a base station according to an exemplary embodiment herein.

FIG. 36 is a diagram of a structure of a base station 3600 according to an exemplary embodiment. As shown in FIG. 36, the base station may be applicable to a 5G NR network.

Referring to FIG. 36, the base station 3600 may include a processing component 3622, a radio transmitting/receiving component 3624, an antenna component 3626, and a signal processing part dedicated to a radio interface. The processing component 3622 may further include one or more processors.

A processor of the processing component 3622 may be adapted to:

determining system control information of an extensible Band Width Part (BWP), the system control information being configured to inform target User Equipment (UE) of configuration of the extensible BWP in a licensed band and an unlicensed band;

sending the system control information of the extensible BWP to the target UE; and scheduling, according to the system control information, the target UE to perform information transmission on the extensible BWP.

In an exemplary embodiment, a non-transitory computer-readable storage medium including instructions, having stored thereon computer-executable instructions which, when executed by the processing component 3622 of the base station 3600 to implement a method for transmitting information of any one of FIG. 1 to FIG. 12. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

Figure 37:
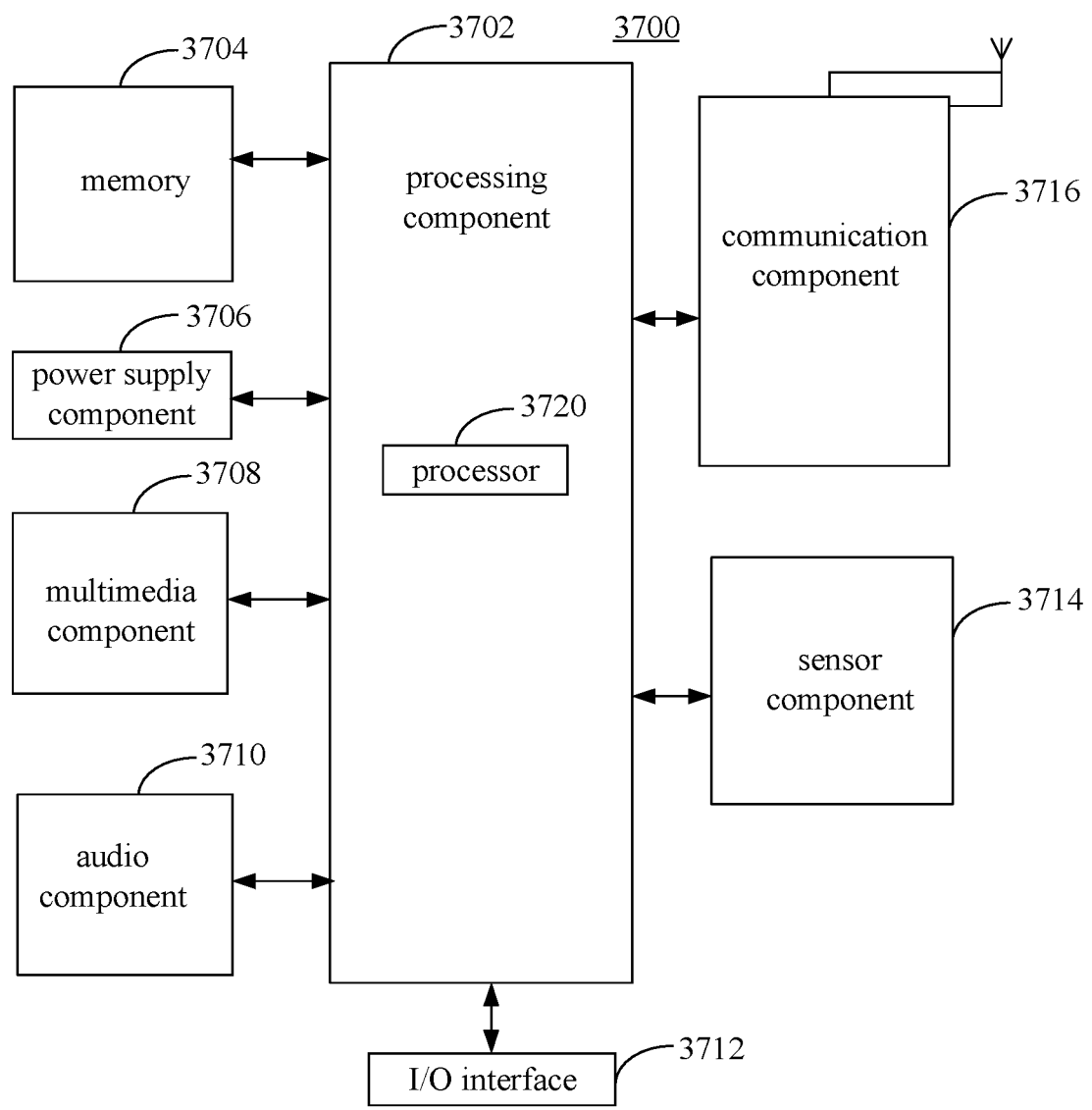
FIG. 37 is a diagram of a structure of UE according to an exemplary embodiment herein.

FIG. 37 is a diagram of a structure of UE 3700 according to an exemplary embodiment. For example, the UE 3700 may be UE in a 5G NR network. The UE may be a mobile phone, a computer, digital broadcast UE, messaging equipment, a gaming console, tablet equipment, medical equipment, fitness equipment, a personal digital assistant, wearable equipment such as a smart watch, smart glasses, a smart wristband, smart sneakers, etc.

Referring to FIG. 37, the UE 3700 may include at least one of a processing component 3702, memory 3704, a power supply component 3706, a multimedia component 3708, an audio component 3710, an Input/Output (I/O) interface 3712, a sensor component 3714, a communication component 3716, etc.

The processing component 3702 may generally control an overall operation of the UE 3700, such as operations associated with display, a telephone call, data communication, a camera operation, a recording operation, etc. The processing component 3702 may include one or more processors 3720 to execute instructions so as to complete all or a part of an aforementioned method. In addition, the processing component 3702 may include one or more modules to facilitate interaction between the processing component 3702 and other components. For example, the processing component 3702 may include a multimedia portion to facilitate interaction between the multimedia component 3708 and the processing component 3702.

The memory 3704 may be adapted to storing various types of data to support the operation at the UE 3700. Examples of such data may include instructions of any application or method adapted to operating on the UE 3700, contact data, phonebook data, messages, pictures, videos, etc. The memory 3704 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 3706 may supply electric power to various components of the UE 3700. The power supply component 3706 may include a power management system, one or more power sources, and other components related to generating, managing, and distributing electricity for the UE 3700.

The multimedia component 3708 may include a screen that provides an output interface between the UE 3700 and a user. The screen may include a Liquid Crystal Display (LCD), a Touch Panel (TP), etc. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 3708 may include at least one of a front camera or a rear camera. When the UE 3700 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 3710 may be adapted to outputting and/or inputting an audio signal. For example, the audio component 3710 may include a microphone (MIC). When the UE 3700 is in an operation mode such as a call mode, a recording mode, a voice recognition mode, etc., the MIC may be adapted to receiving an external audio signal. The received audio signal may be further stored in the memory 3704 or may be sent via the communication component 3716. The audio component 3710 may further include a loudspeaker adapted to outputting the audio signal.

The I/O interface 3712 may provide an interface between the processing component 3702 and a peripheral interface portion. Such a peripheral interface portion may be a keypad, a click wheel, a button, etc. Such a button may include but is not limited to at least one of a homepage button, a volume button, a start button, or a lock button.

The sensor component 3714 may include one or more sensors for assessing various states of the UE 3700. For example, the sensor component 3714 may detect an on/off state of the UE 3700 and relative positioning of components such as the display and the keypad of the UE 3700. The sensor component 3714 may further detect a change in the position of the UE 3700 or of a component of the UE 3700, whether there is contact between the UE 3700 and a user, the orientation or acceleration/deceleration of the UE 3700, a change in the temperature of the UE 3700, etc. The sensor component 3714 may include a proximity sensor adapted to detecting existence of a nearby object without physical contact. The sensor component 3714 may further include an optical sensor such as a Complementary Metal-Oxide-Semiconductor (CMOS) or a Charge-Coupled-Device (CCD) image sensor used in an imaging application. The sensor component 3714 may further include an acceleration sensor, a gyroscope sensor, a magnetic sensor, a pressure sensor, a temperature sensor, etc.

The communication component 3716 may be adapted to facilitating wired or wireless communication between the UE 3700 and other equipment. The UE 3700 may access a wireless network based on a communication standard such as Wi-Fi, 2G, 3G . . . , or a combination thereof. The communication component 3716 may broadcast related information or receive a broadcast signal from an external broadcast management system via a broadcast channel. The communication component 3716 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

In an exemplary embodiment, the UE 3700 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

In an exemplary embodiment, a non-transitory computer-readable storage medium including instructions, such as memory 3704 including instructions, may be provided. The instructions may be executed by the processor 3720 of the UE 3700 to implement an aforementioned method for transmitting information of any one of FIG. 13 to FIG. 17. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

Other implementations of the subject disclosure will be apparent to a person having ordinary skill in the art that has considered the specification and or practiced the subject disclosure. The subject disclosure is intended to cover any variation, use, or adaptation of the subject disclosure following the general principles of the subject disclosure and including such departures from the subject disclosure as come within common knowledge or customary practice in the art. The specification and the embodiments are intended to be exemplary only, with a true scope and spirit of the subject disclosure being indicated by the appended claims.

Note that the subject disclosure is not limited to the exact construction that has been described above and illustrated in the accompanying drawings, and that various modifications and changes can be made to the subject disclosure without departing from the scope of the subject disclosure. It is intended that the scope of the subject disclosure is limited only by the appended claims.

What is claimed is:

1. A method for transmitting information, being applied in a base station, the method comprising:
   determining system control information for an extensible Band Width Part (BWP), the system control information being configured to inform a target User Equipment (UE) configurations in a licensed band and an unlicensed band of the extensible BWP;
   sending the system control information for the extensible BWP to the target UE; and
   scheduling, according to the system control information, the target UE to perform information transmission on the extensible BWP,
   wherein the determining the system control information for the extensible BWP comprises:
   in response to determining that a preset trigger condition is met, configuring, for the target UE, a resource of the extensible BWP in the licensed band and a resource of the extensible BWP in the unlicensed band; and
   determining the system control information for the extensible BWP according to a time-frequency range of the resource of the extensible BWP in the licensed band and the resource of the extensible BWP in the unlicensed band,
wherein configuring, for the target UE, the resource of the extensible BWP in the unlicensed band comprises:
monitoring an effective transmission resource meeting a preset channel quality condition in the unlicensed band; and
configuring, for the target UE, the resource of the extensible BWP in the unlicensed band according to the effective transmission resource,
wherein the monitoring the effective transmission resource meeting the preset channel quality condition in the unlicensed band comprises:
determining a target frequency range supported by the target UE in the unlicensed band; and
monitoring the effective transmission resource meeting the preset channel quality condition in the target frequency range,
wherein the monitoring the effective transmission resource meeting the preset channel quality condition in the target frequency range comprises:
monitoring, according to a preset channel bandwidth, a channel quality value of a preset channel in the target frequency range; and
in response to determining that the channel quality value is no less than a preset channel quality threshold, determining the preset channel as an effective channel, and
wherein the configuring, for the target UE, the resource of the extensible BWP in the unlicensed band according to the effective transmission resource comprises:
determining a time-domain resource range allocated to the target UE on the effective channel; and
determining a time-frequency range of the resource of the extensible BWP in the unlicensed band according to the time-domain resource range and the preset channel bandwidth of the effective channel.

2. The method of claim 1, wherein the preset trigger condition comprises at least one of:
traffic to be transmitted for the target UE exceeding a preset traffic threshold;
a type of a service to be transmitted for the target UE comprising a preset service type; or
a power consumption of the target UE being no greater than a preset power consumption threshold.

3. The method of claim 1, wherein configuring, for the target UE, the resource of the extensible BWP in the unlicensed band comprises:
configuring, for the target UE, the resource of the extensible BWP in the unlicensed band on a preset channel in the unlicensed band; or
configuring, for the target UE, the resource of the extensible BWP in the unlicensed band according to a historical record of scheduling the target UE in the unlicensed band.

4. The method of claim 1, wherein the system control information for the extensible BWP comprises: a time-frequency range of the resource in the licensed band, a time-frequency range of the resource in the unlicensed band, and configuration of a resource for transmitting control information among the resource in the licensed band and the resource in the unlicensed band.

5. The method of claim 1, wherein the sending the system control information for the extensible BWP to the target UE comprises: sending, to the target UE, preset Downlink Control Information (DCI) for the resource in the unlicensed band by at least one of:
sending the preset DCI to the target UE by loading the preset DCI onto a resource for transmitting control information in the licensed band; or
sending the preset DCI to the target UE by loading the preset DCI onto a resource for transmitting control information in the unlicensed band,
wherein the preset DCI comprises information on scheduling of the resource in the unlicensed band.

6. The method of claim 1, wherein the scheduling, according to the system control information, the target UE to perform information transmission on the extensible BWP comprises:
sending, to the target UE, activation indication indicating that the extensible BWP is activated;
in response to determining that the target UE has completed transmission configuration according to the activation indication and the system control information, scheduling the target UE to perform information transmission on the extensible BWP.

7. The method of claim 6, comprising: before the sending, to the target UE, the activation indication indicating that the extensible BWP is activated,
in response to determining that the target UE is being scheduled on a first BWP in the licensed band, sending, to the target UE, deactivation indication for deactivating the first BWP.

8. The method of claim 1, wherein the determining the system control information for the extensible BWP comprises:
determining, according to preset reference indication sent by the target UE, whether the target UE is supporting transmission over the unlicensed band;
in response to determining that the target UE is supporting transmission over the unlicensed band, determining the system control information for the extensible BWP.

9. The method of claim 1, wherein the determining the system control information for the extensible BWP for the target UE comprises:
determining, according to at least one of a service bearing condition or a power consumption of the base station, whether the base station is supporting unlicensed band resource configuration;
in response to determining that the base station is supporting unlicensed band resource configuration, determining the system control information for the extensible BWP for the target UE.

10. A method for transmitting information, being applied in User Equipment (UE), the method comprising:
acquiring system control information for an extensible Band Width Part (BWP), the extensible BWP comprising a resource in a licensed band and a resource in an unlicensed band;
in response to receiving activation indication indicating that the extensible BWP is activated, configuring, according to the system control information, transmission over the extensible BWP; and
transmitting information to a base station using the extensible BWP,
wherein the system control information for the extensible BWP comprises a set location of information on scheduling of the resource in the licensed band and the resource in the unlicensed band,
wherein the transmitting information to the base station using the extensible BWP comprises:

acquiring, according to the set location, the information on scheduling of the resource in the licensed band and the resource in the unlicensed band in the extensible BWP; and
in response to determining that the base station schedules the extensible BWP, transmitting information according to the information on scheduling,
wherein the information on scheduling of the resource in the unlicensed band is acquired from the extensible BWP by at least one of:
acquiring, from a resource for transmitting control information in the licensed band, the information on scheduling of the resource in the unlicensed band; or
acquiring, from a resource for transmitting control information in the unlicensed band, the information on scheduling of the resource in the unlicensed band,
wherein acquiring the information on scheduling of the resource in the unlicensed band from the extensible BWP comprises:
in response to determining that the information on scheduling of the resource in the unlicensed band is detected from both the resource for transmitting control information in the licensed band and the resource for transmitting control information in the unlicensed band, comparing the information on scheduling detected from the licensed band and the information on scheduling detected from the unlicensed band;
in response to determining that the information on scheduling detected from the licensed band differs from the information on scheduling detected from the unlicensed band, determining, according to preset indication, the information on scheduling of the resource in the unlicensed band, and
wherein the preset indication comprises one of:
taking the information on scheduling acquired from the resource for transmitting control information in the licensed band as the information on scheduling of the resource in the unlicensed band;
taking the information on scheduling acquired from the resource for transmitting control information in the unlicensed band as the information on scheduling of the resource in the unlicensed band; or
determining, according to a combination of the information on scheduling acquired from the licensed band and the information on scheduling acquired from the unlicensed band, the information on scheduling of the resource in the unlicensed band.

11. The method of claim 10, further comprising: before the acquiring the system control information for the extensible BWP,
sending preset reference indication to the base station, the preset reference indication indicating whether the UE is supporting transmission over the unlicensed band.

12. The method of claim 11, comprising:
in response to receiving preset control information sent by the base station, stopping sending the preset reference indication to the base station.

13. A User Equipment (UE), comprising a processor and memory,
wherein the memory is configured to store an instruction executable by the processor,
wherein the processor is configured to implement:
acquiring system control information for an extensible Band Width Part (BWP), the extensible BWP comprising a resource in a licensed band and a resource in an unlicensed band;
in response to receiving activation indication indicating that the extensible BWP is activated, configuring, according to the system control information, transmission over the extensible BWP; and
transmitting information to a base station using the extensible BWP,
wherein the system control information for the extensible BWP comprises a set location of information on scheduling of the resource in the licensed band and the resource in the unlicensed band,
wherein the transmitting information to the base station using the extensible BWP comprises:
acquiring, according to the set location, the information on scheduling of the resource in the licensed band and the resource in the unlicensed band in the extensible BWP; and
in response to determining that the base station schedules the extensible BWP, transmitting information according to the information on scheduling,
wherein the information on scheduling of the resource in the unlicensed band is acquired from the extensible BWP by at least one of:
acquiring, from a resource for transmitting control information in the licensed band, the information on scheduling of the resource in the unlicensed band; or
acquiring, from a resource for transmitting control information in the unlicensed band, the information on scheduling of the resource in the unlicensed band,
wherein acquiring the information on scheduling of the resource in the unlicensed band from the extensible BWP comprises:
in response to determining that the information on scheduling of the resource in the unlicensed band is detected from both the resource for transmitting control information in the licensed band and the resource for transmitting control information in the unlicensed band, comparing the information on scheduling detected from the licensed band and the information on scheduling detected from the unlicensed band;
in response to determining that the information on scheduling detected from the licensed band differs from the information on scheduling detected from the unlicensed band, determining, according to preset indication, the information on scheduling of the resource in the unlicensed band, and
wherein the preset indication comprises one of:
taking the information on scheduling acquired from the resource for transmitting control information in the licensed band as the information on scheduling of the resource in the unlicensed band;
taking the information on scheduling acquired from the resource for transmitting control information in the unlicensed band as the information on scheduling of the resource in the unlicensed band; or
determining, according to a combination of the information on scheduling acquired from the licensed band and the information on scheduling acquired from the unlicensed band, the information on scheduling of the resource in the unlicensed band.

\* \* \* \* \*